US012626399B2

(12) United States Patent
Kubota

(10) Patent No.: US 12,626,399 B2
(45) Date of Patent: May 12, 2026

(54) INFORMATION PROCESSING DEVICE, INFORMATION PROCESSING SYSTEM, AND ESTIMATION METHOD

(71) Applicant: Panasonic Intellectual Property Management Co., Ltd., Osaka (JP)

(72) Inventor: Masao Kubota, Tokyo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 277 days.

(21) Appl. No.: 18/286,715

(22) PCT Filed: Feb. 22, 2022

(86) PCT No.: PCT/JP2022/007304
§ 371 (c)(1),
(2) Date: Oct. 12, 2023

(87) PCT Pub. No.: WO2022/219932
PCT Pub. Date: Oct. 20, 2022

(65) Prior Publication Data
US 2024/0257390 A1　Aug. 1, 2024

(30) Foreign Application Priority Data
Apr. 15, 2021　(JP) ................................. 2021-069251

(51) Int. Cl.
*G06T 7/73* (2017.01)
*G06F 21/32* (2013.01)
*G06T 7/246* (2017.01)

(52) U.S. Cl.
CPC ................ *G06T 7/74* (2017.01); *G06F 21/32* (2013.01); *G06T 7/248* (2017.01); *G06T 2207/30201* (2013.01)

(58) Field of Classification Search
CPC .......... G06T 7/74; G06T 7/248; G06T 7/246; G06T 2207/30201; G06F 21/32; G07B 15/00; G07C 9/37
See application file for complete search history.

(56) References Cited

U.S. PATENT DOCUMENTS

2004/0136574 A1 * 7/2004 Kozakaya ............ G06V 40/161
382/118
2006/0204050 A1 9/2006 Takizawa
(Continued)

FOREIGN PATENT DOCUMENTS

EP　　3644219 A1 * 4/2020 ............ G06T 7/248
JP　　H09-330440 A 12/1997
JP　　2006-236244 A 9/2006

OTHER PUBLICATIONS

International Search Report issued in International Bureau of WIPO Patent Application No. PCT/JP2022/007304, dated May 17, 2022, along with an English translation thereof.

*Primary Examiner* — John B Strege
(74) *Attorney, Agent, or Firm* — GREENBLUM & BERNSTEIN, P.L.C.

(57) ABSTRACT

Provided are an information processing device, an information processing system, and an estimation method, which are capable of improving the accuracy of estimating the position of an object planned to pass through a specific area. This information processing device comprises a detection unit that detects a first face image area included in a first image obtained by photographing a person, who is entering a gate, in a first direction, and a second face image area included in a second image obtained by photographing the person in a second direction different from the first direction, and an estimation unit that estimates the position of the person in (Continued)

the gate on the basis of a change in relative positional relationship between the first face image area and the second face image area.

12 Claims, 17 Drawing Sheets

(56)                    References Cited

U.S. PATENT DOCUMENTS

2007/0242860 A1*  10/2007  Hasebe ................ G06V 40/166
                                                          382/118
2016/0156839 A1*   6/2016  Shimura ............ G08B 21/0476
                                                          348/159
2018/0330285 A1*  11/2018  Nagao .................... G06Q 10/04
2020/0125855 A1*   4/2020  Yamashita ............... G07C 9/32
2022/0145690 A1*   5/2022  Kochi ........................ G06T 7/50
2024/0127479 A1*   4/2024  Shimizu .............. G01B 11/245

* cited by examiner

| Distance from charging line | Center of face frame | Size of face frame | Direction of vector |
|---|---|---|---|
| Distant | Right image: to left<br>Left image: to right | Small | X-axis positive direction |
| Intermediate | Right image: close to center<br>Left image: close to center | Intermediate | Crossing from X-axis positive direction to negative direction |
| Close | Right image: to right<br>Left image: to left | Large | X-axis negative direction |

FIG. 5B

Face frame detection information

201

Face frame position determination library

202

Person tracking information (person ID, occurrence/ tracking/disappearance) = compatible information Passage management library Passage management event Passage management processor

203

Passage information output

Result output

204

INFORMATION PROCESSING DEVICE, INFORMATION PROCESSING SYSTEM, AND ESTIMATION METHOD

TECHNICAL FIELD

The present disclosure relates to an information processing apparatus, an information processing system, and an estimation method.

BACKGROUND ART

Techniques for managing entry and exit of a person passing through a gate installed in a station, an airport, or the like are known. Patent Literature (hereinafter, referred to as "PTL") 1 describes an apparatus that, when a person enters a gate from an entrance of the gate while gaining permission for gate passage using a contactless card, tracks whether or not the person has passed through the gate (whether or not the person returns to the entrance of the gate) based on a change in position of the contactless card.

CITATION LIST

Patent Literature

PTL 1
Japanese Patent Application Laid-Open No. H09-330440

SUMMARY OF INVENTION

A gate that manages entry and exit is desired to manage which person has passed through the gate. Hereinafter, this management may also be simply referred to as "passage management" or "tracking management." There is scope for further study on the improvement in estimation accuracy of estimating the position of a person in the tracking management.

One non-limiting and exemplary embodiment of the present disclosure facilitates providing an information processing apparatus, an information processing system, and an estimation method capable of improving estimation accuracy of estimating the position of an object passing through a particular region.

An information processing apparatus according to one exemplary embodiment of the present disclosure includes: a detector that detects a first face image region included in a first image of a person entering a gate and a second face image region included in a second image of the person, the first image being captured in a first direction, the second image being captured in a second direction different from the first direction; and an estimator that estimates a position of the person in the gate based on a change in a relative positional relation between the first face image region and the second face image region.

An information processing system according to one exemplary embodiment of the present disclosure includes: an authentication apparatus that executes an authentication process of authenticating a person using at least one of a first image of a person entering a gate and a second image of the person, the first image being captured in a first direction, the second image being captured in a second direction different from the first direction; and an information processing apparatus that detects a first face image region included in the first image and a second face image region included in the second image, and estimates a position of the person in the gate based on a change in a relative positional relation between the first face image region and the second face image region.

An estimation method according to one exemplary embodiment of the present disclosure includes steps performed by an information processing apparatus of: detecting a first face image region included in a first image of a person entering a gate and a second face image region included in a second image of the person, the first image being captured in a first direction, the second image being captured in a second direction different from the first direction; and estimating a position of the person in the gate based on a change in a relative positional relation between the first face image region and the second face image region.

It should be noted that a general or specific embodiment may be implemented as a system, an apparatus, a method, an integrated circuit, a computer program, a storage medium, or any selective combination thereof.

One non-limiting and exemplary embodiment of the present disclosure makes it possible to improve estimation accuracy of estimating the position of an object passing through a particular region.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 5B is a diagram illustrating an example of a relationship of the size and the center of the face frame with respect to the position of the person;

DESCRIPTION OF EMBODIMENTS

Figure 1:
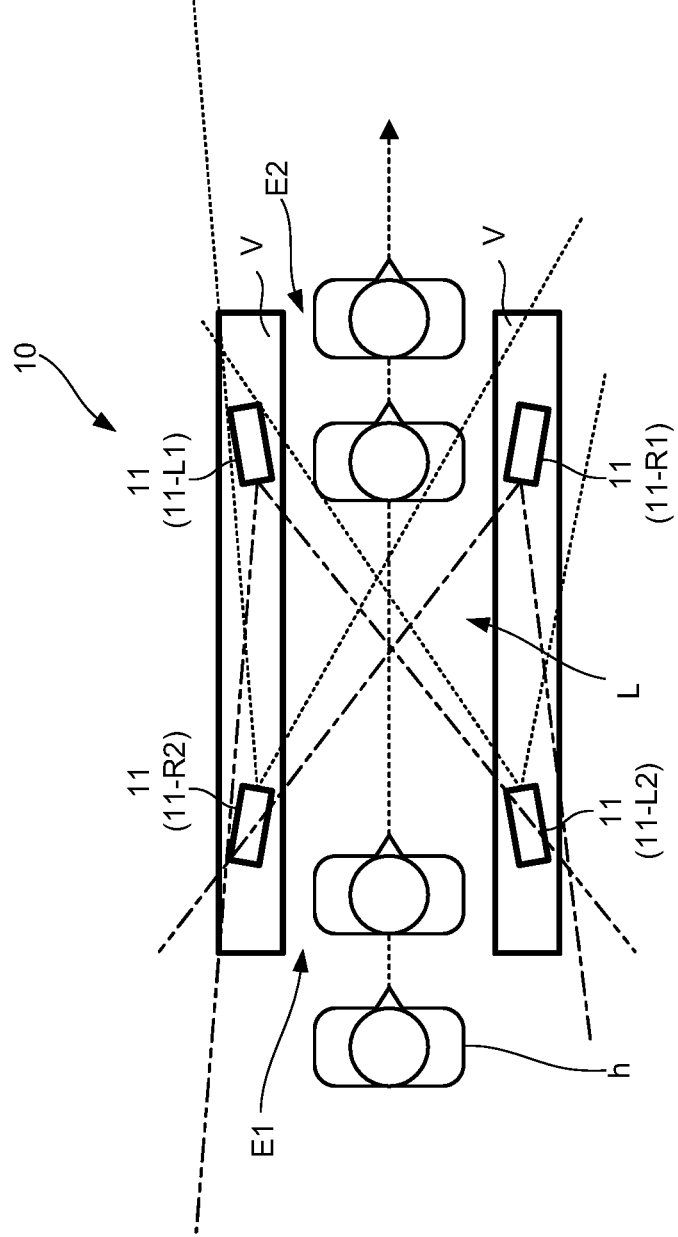
FIG. 1 is a diagram illustrating an example of a gate according to an embodiment.

Hereinafter, preferred embodiments of the present disclosure will be described in detail with reference to the appended drawings. Note that, in the present specification and drawings, components having substantially the same functions are provided with the same reference symbols, and redundant description will be omitted.

One Embodiment

Knowledge Leading to Present Disclosure

As for a gate that is installed in a facility such as a station or an airport and at which the entry to or exit from the facility is managed, utilizing passage management for accurately managing which person has passed through the gate and whether the person has correctly passed through the gate has been examined. If the passage management is not sufficient, for example, gate passage of a person may be erroneously determined who entered through the entrance of the gate and returned to the entrance of the gate without moving toward the exit, or it may be erroneously recognized that a person who has actually passed has not passed the gate. Such errors can lead to mischarge, for example, in services such as that in which a person who has passed through a gate, such as a station ticket gate, is charged.

In order to perform the passage management, for example, an authentication process of authenticating a person intending passage (which process may, for example, include a process of determining that the authenticating process of a person cannot be performed) and a tracking process of recording a history of movement of the person are performed. These processes are preferably performed at an early stage in order to secure time for performing processes such as recording the passage of a person or the opening and closing process of a door of the gate, for example, which restricts the movement of the person.

For example, it is considered that a camera is installed above the person and the gate (for example, on a ceiling portion), the camera on the ceiling portion captures the image of the person and the gate, and the captured image is analyzed for a tracking process for tracking the image-captured person.

However, when the camera is installed on the ceiling portion, the installation location of the camera may be limited depending on the structure or environment of the installation location. In addition, even when the installation is possible, the installation cost increases in a case where a large-scale construction is required for the installation. Therefore, it may be difficult to introduce a passage management system using a camera installed on a ceiling portion.

For example, it is conceivable to provide a gate with an arcuate or pole-shaped support portion extending above the gate, and install a camera on the support portion. However, the gate having such a support portion may have a larger size in the height direction than a gate having no support portion.

Accordingly, the installation location of the gate may be limited. In addition, it may be undesirable to provide the gate with a support portion in a design aspect.

In the present embodiment, a passage management process including an authentication process and a tracking process is performed by performing the tracking process for tracking a person who is going to pass through a gate by using an image captured by a camera used in a face authentication process of the person who is going to pass through the gate. Since the camera used in the authentication process is used also in the tracking process, it is not necessary to separately install an apparatus (for example, a camera on a ceiling portion or the like) for the tracking process. Therefore, it is possible to suppress an increase in the introduction cost of the passage management. In addition, as compared with the case where equipment such as a dedicated camera is installed for the tracking process, a restriction on the installation location is relaxed. Thus, the degree of freedom in the installation location increases, and the introduction of the passage management system is facilitated.

<Exemplary Configuration of Gate>

FIG. 1 is a diagram illustrating an example of gate 10 according to the present embodiment. FIG. 1 is a view of gate 10 viewed from above, and illustrates a state in which person h enters through entrance/exit E1 of gate 10 and exits through entrance/exit E2 of gate 10. Note that, with respect to gate 10 illustrated in FIG. 1, a person may enter through entrance/exit E2 and exit through entrance/exit E1. In other words, gate 10 allows a person to pass in opposite directions.

Gate 10 includes, for example, side walls V facing each other, and path L for guiding a person passing through gate 10 is formed between side walls V. Each of side walls V having a height of 1 m or the like is, for example, at an upper portion, provided with cameras 11 at two positions closer to entrance/exits E1 and E2, respectively, than to the central portion of side wall V. A total of four cameras 11 (11-R1, 11-R2, 11-L1, 11-L2) are disposed for two side walls V.

Cameras 11-R1 and 11-L1 are installed, for example, respectively on side walls V at positions closer to entrance/exit E2 than to the central portion of gate 10, and are used for capturing an image of a person who enters through entrance/exit E1 of gate 10 and passes toward entrance/exit E2.

On the other hand, cameras 11-R2 and 11-L2 are installed, for example, respectively on side walls V at positions closer to entrance/exit E1 than to the central portion of gate 10, and are used for capturing an image of a person who enters through entrance/exit E2 of gate 10 and passes toward entrance/exit E1.

For example, camera 11-R1 is installed at a position where an image of a person can be captured from the right front of the person entering through entrance/exit E1. Camera 11-L1 is installed, for example, at a position where an image of a person can be captured from the left front of the person entering through entrance/exit E1.

For example, camera 11-R2 is installed at a position where an image of a person can be captured from the right front of the person entering through entrance/exit E2 opposite to entrance/exit E1. For example, camera 11-L2 is installed at a position where an image of a person can be captured from the left front of the person entering through entrance/exit E2 opposite to entrance/exit E1.

Therefore, an image of a person who enters gate 10 through entrance/exit E1 and passes toward entrance/exit E2 is captured from two directions (for example, the left and right directions) by, for example, two cameras 11-R1 and 11-L1 installed on the upper portions of two side walls V at positions apart from each other with path L being interposed therebetween.

On the other hand, an image of a person who passes through gate 10 in the reverse direction, that is, a person who enters gate 10 through entrance/exit E2 and passes through entrance/exit E1 is captured from two directions (for example, the left and right directions) by, for example, two cameras 11-R2 and 11-L2 installed on the upper portions of two side walls V at positions apart from each other with path L being interposed therebetween.

Note that FIG. 1 illustrates a configuration in which a person can enter through both entrance/exit E1 and entrance/exit E2 of gate 10, but the present disclosure is not limited to this. For example, gate 10 may be configured such that a person can enter through one entrance (e.g., entrance/exit E1) and cannot enter through the other entrance (e.g., entrance/exit E2). In a configuration in which gate 10 does not allow entry of a person through entrance/exit E2, camera 11-R2 and camera 11-L2 may not be installed. In a configuration in which gate 10 does not allow entry of a person through entrance/exit E1, camera 11-R1 and camera 11-L1 may not be installed.

In the following, an example will be described in which, at gate 10 illustrated in FIG. 1, the passage management of a person entering through entrance/exit E1 and passing toward entrance/exit E2 is performed using camera 11-R1 and camera 11-L1. Camera 11-R1 and camera 11-L1 may be collectively referred to as cameras 11 for convenience.

Further, camera 11-R1 may be described as right camera 11, and an image captured by right camera 11 may be described as a "right image." Similarly, camera 11-L1 may be described as left camera 11, and an image captured by left camera 11 may be described as a "left image."

The person entering gate 10 corresponds to a person as a target of a process including the face authentication process. Hereinafter, the person as a target of the process is referred to as a "target person."

Note that gate 10 of FIG. 1 is an example, and the present disclosure is not limited to this. For example, five or more cameras 11 may be installed on gate 10, or three or less cameras 11 may be installed. By changing the image-capturing directions and/or the angles of cameras 11, it is possible to capture an image of a face of a person in a wider range. In the case where two cameras 11 are installed, one of them may be installed at a position where an image of a person entering gate 10 is captured from a first direction, and the other of them may be installed at a position where an image of a person entering gate 10 is captured from a second direction. Camera 11 may be installed at positions where an image of a face of a person entering gate 10 is captured from the front, or may be installed at positions where an image of at least a part of the face (for example, a right half or a left half of the face) is captured. For example, camera 11 may be installed at positions where an image in which a face frame can be detected by below-describing face frame detection is captured.

Note that the plurality of cameras 11 may not be identical to one another. For example, the plurality of cameras 11 may be configured to capture images of different resolutions, angle of view, and image quality. In addition, the installation positions and/or the image-capturing directions of cameras 11 may be fixed or adjustable.

<System Configuration>

Figure 2A:
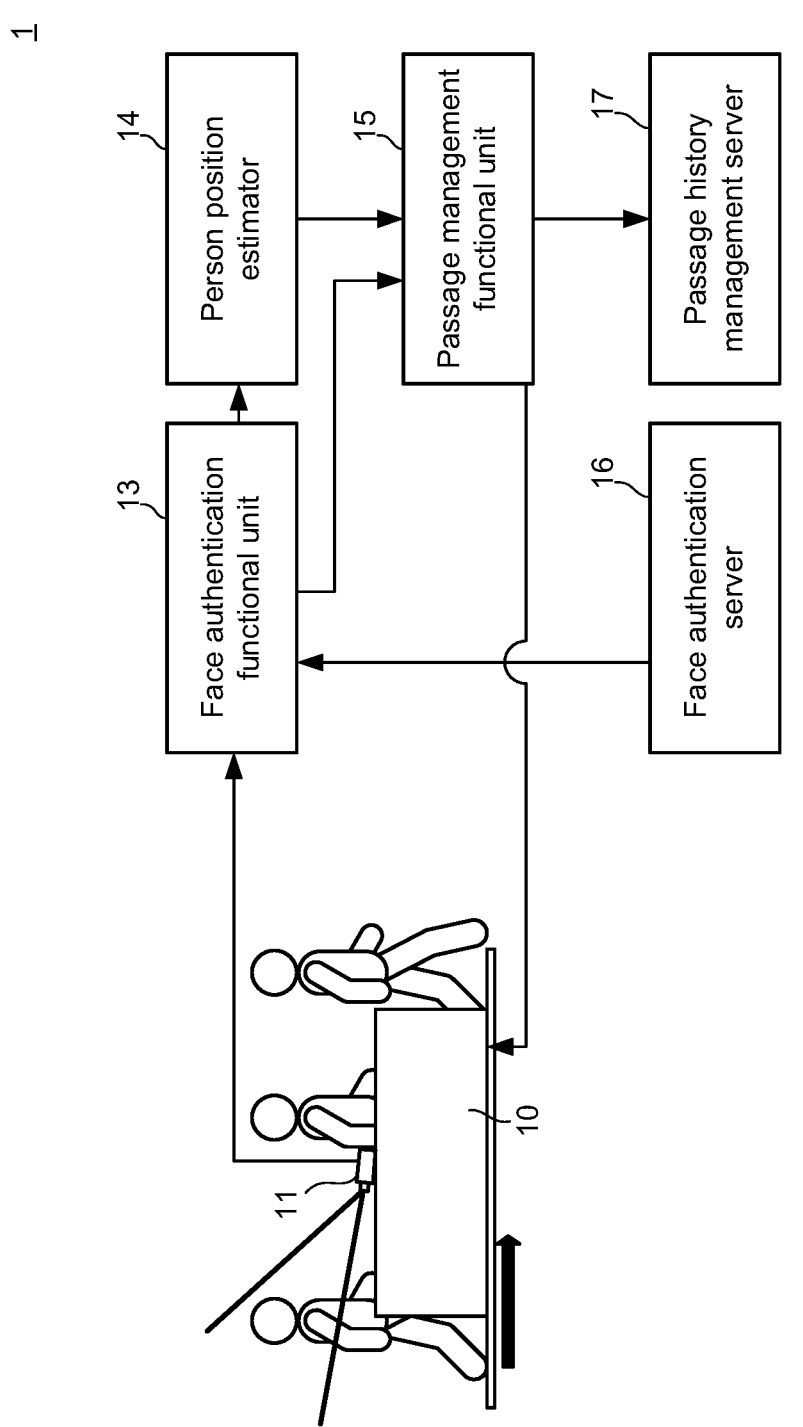
FIG. 2A is a diagram illustrating an example of a concept of a configuration of a passage management system according to an embodiment.
Figure 2B:
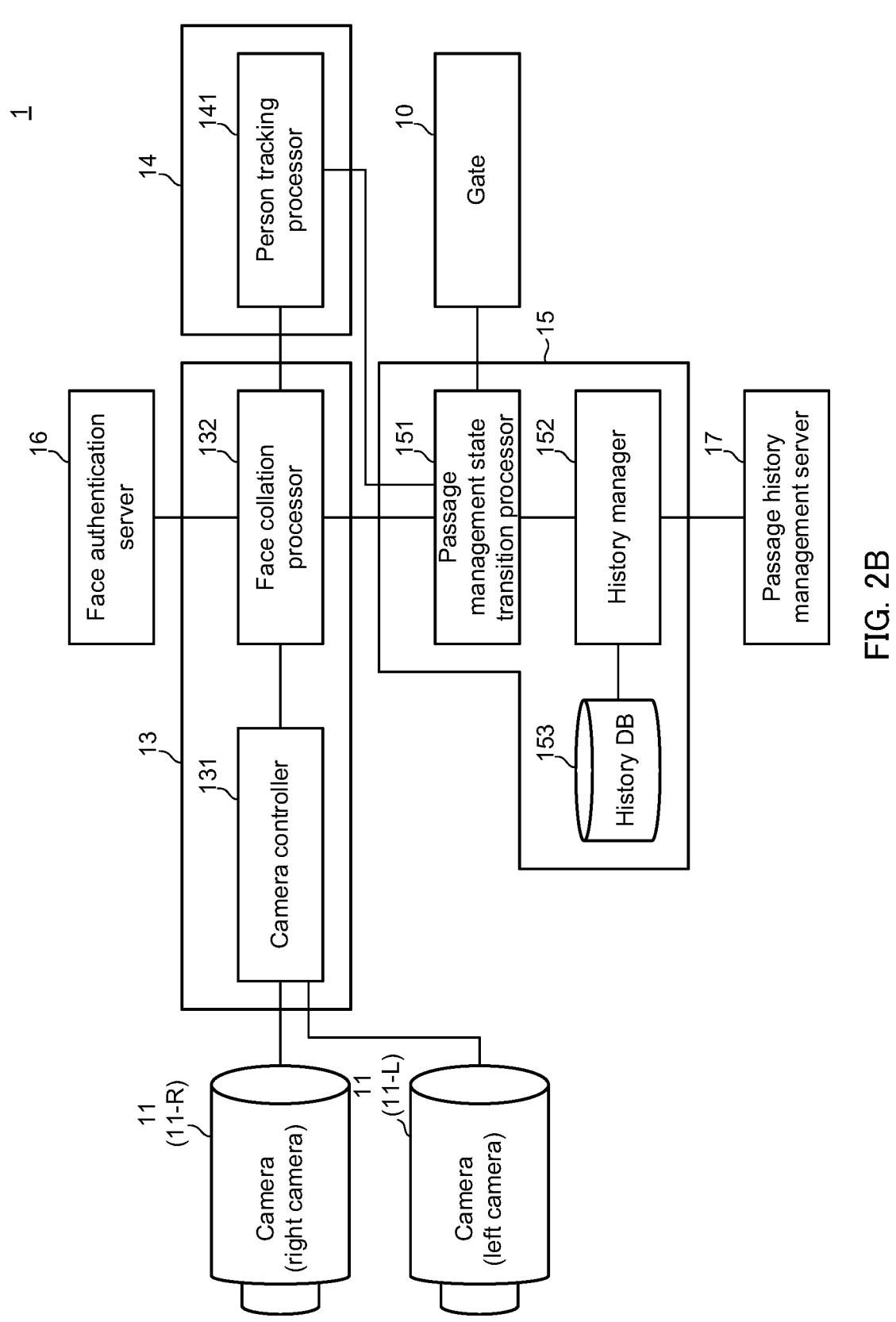
FIG. 2B is a block diagram illustrating a configuration example of the passage management system according to an embodiment.

FIG. 2A is a diagram illustrating a configuration of a passage management system according to the present embodiment. FIG. 2B is a block diagram illustrating an exemplary configuration of the passage management system according to the present embodiment. Passage management system 1 according to the present embodiment is a system that manages the passage of a person at gate 10 (for example, an entry gate, a ticket gate, or the like) installed at an entrance/exit of a facility such as an airport, a station, or an event hall.

In passage management system 1 according to the present embodiment, for example, management of entry and leaving of a user who uses the facility is executed by face authentication. For example, when the user enters the facility through gate 10, it is determined by face authentication whether or not the user is a person permitted to enter the facility. Further, when the user passes through the gate and leaves the facility, it is determined by face authentication which user leaves the facility. Note that "face authentication" may be regarded as a concept included in "collation using a face image."

Passage management system 1 includes, for example, gate 10 illustrated in FIG. 1, cameras 11 (right camera 11 and left camera 11), face authentication functional unit 13, person position estimator 14, passage management functional unit 15, face authentication server 16, and passage history management server 17. Passage management system 1 may include one gate 10 or a plurality of gates 10.

Gate 10 is installed in a facility such as an airport, a station, or an event hall, for example. A user authorized to use the facility passes through gate 10 when entering and/or leaving the facility. In addition, gate 10 performs a control to prevent passage of a person who is not permitted to enter the facility.

As illustrated in FIG. 1, cameras 11 are installed, for example, on side walls V of gate 10. Cameras 11 capture an image of an image-capturing range including a person passing through gate 10 and a face of a person who is going to pass through gate 10 of when such a person is present. For example, the image-capturing range of cameras 11 is a range in which an image of a face of a front of a person can be captured.

The image captured by camera 11 may be used in a person detection process (or a person tracking process) to be described later, or may be used in a face authentication process to be described later.

Face authentication functional unit 13 performs the face authentication process on the image. For example, face authentication functional unit 13 includes camera controller 131 and face collation processor 132.

Camera controller 131 controls, for example, an image-capturing timing of cameras 11. For example, cameras 11 capture an image at a rate of about 5 frames per second (fps) under the control of camera controller 131. Further, right camera 11 and left camera 11 may perform image capturing at the same time or with a difference in image-capturing timing within an allowable range under the control of camera controller 131, for example. In other words, the image-capturing timing of right camera 11 and the image-capturing timing of left camera 11 are synchronized by the control of camera controller 131, for example.

For example, camera controller 131 detects a face frame from images (a right image and/or a left image) captured by cameras 11. A method of detecting the face frame is not particularly limited, but may be, for example, a method of detecting a frame (face frame) surrounding a face region by detecting parts (eyes, nose, and mouth) included in the face from the images and detecting a boundary between the face region and a region outside the face based on the detected positions and color information of the parts. For example, when the face frame is detected, camera controller 131 outputs information on the detected face frame (face frame information) and the captured images to face collation processor 132. For example, face collation processor 132 cuts out the face region included in the images based on the face frame information, and indicates, to face authentication server 16, a face collation request including the information on the cut-out face region. The information on the face region may be, for example, an image of the face region or information indicating feature points extracted from the image of the face region.

For example, face images of persons permitted to pass through gate 10 are registered in face authentication server 16. The face images registered in face authentication server 16 may be described as registered face images. The registered face images may be associated with, for example, Identifications (IDs) of registered persons, which can uniquely identify or specify the persons. The registered face images may be, for example, information indicating feature points extracted from the images.

For example, when receiving the face collation request from face collation processor 132, face authentication server 16 determines whether or not the registered face images include a face of an identical person the same as the face in the face region included in the face collation request. For example, face authentication server 16 indicates, to face collation processor 132, a face collation result including a determination result. The face collation result may include, for example, information (for example, a flag indicating "OK" or "NG") indicating whether or not the face of the identical person the same as the face in the face area is included in the registered face images, and information (for example, an ID) of the person associated with a registered face image when the face of the identical person the same as the face in the face region is included in the registered face images.

The collation is, for example, to collate the registered face images with the face image of the person passing through gate 10, so as to determine whether or not any one of the registered face images registered in advance matches the face image of the person passing through gate 10, or whether or not any one of the registered face images registered in advance and the face image of the person passing through gate 10 are the face images of an identical person.

On the other hand, the authentication is, for example, to prove to the outside (for example, gate 10) that the person of the face image matching one of the face images registered in advance is the person of the registered face image (in other words, the person who is to be permitted to pass through gate 10).

However, in the present disclosure, the terms "collation" and "authentication" may be used interchangeably.

For example, the collation process is a process of comparing the feature points of the registered face images registered in advance with the feature points extracted from the detected face region and specifying whose face the face in the image data is. For example, a technique using machine learning may be used for the collation process. Further, the collation process may be performed in face authentication server 16, for example, but may be performed in another apparatus such as gate 10, or may be performed distributedly by a plurality of apparatuses.

Face collation processor 132 outputs, for example, information including a collation process result to passage management functional unit 15. The collation process result may include, for example, information on the registered face image and a collation score indicating a matching degree of the face image obtained by the collation process. Further, the information output by face collation processor 132 may include, for example, face frame detection information and an image-capturing time of a face image capturing camera image in which the face frame is detected.

Person position estimator 14 performs the person tracking process based on the face frame information, for example. Person position estimator 14 includes, for example, person tracking processor 141.

For example, person tracking processor 141 estimates the position of the person with respect to gate 10 based on the face frame information. Then, person tracking processor 141 tracks the position of the estimated person to determine an event occurring for the person. Examples of the event occurring for the person include an occurrence of a new person, tracking of a person, and disappearance of a person. Person tracking processor 141 performs tracking of a person by, for example, determining an event based on the position of the person and associating together the determined event, information on the position of the person, and information such as the detected time.

For example, person tracking processor 141 outputs information related to the person tracking to passage management functional unit 15. For example, the information on the person tracking includes information on the position of the person and the information such as the detected time.

For example, passage management functional unit 15 manages the state of the person located in the periphery of gate 10 by associating the information output by face authentication functional unit 13 with the information output by person position estimator 14. Examples of the person located in the periphery of gate 10 includes a person passing through gate 10, a person intending to pass through gate 10, and a person passing the periphery of gate 10. Here, the person intending to pass through gate 10 is not limited to a person who is permitted to pass through gate 10 (for example, a person whose face image has been already registered in face authentication server 16), and may be, for example, a person who attempts to pass through the gate although the face image has not been registered in face authentication server 16. Further, the person passing the periphery of gate 10 is, for example, a person who does not intend to pass through gate 10 but passes through the image-capturing range of camera 11 or a person who does not intend to pass through gate 10 but enters the image-capturing range. Further, the state of the person may be, for example, a state related to the movement of the person, such as whether the person is moving or stationary, and a moving direction when the person is moving.

Passage management functional unit 15 includes, for example, passage management state transition processor 151, history manager 152, and history database (DB) 153.

For example, in a passage management process for a person, passage management state transition processor 151 transmits control information related to control of gate 10 when a person permitted to pass through gate 10 passes through gate 10. In addition, passage management state transition processor 151 transmits, for example, the control information related to control of gate 10 in a case where a person who is not permitted to pass through gate 10 is going to pass through gate 10.

For example, history manager 152 stores and manages information (passage history information) indicating a history of a person who has passed through gate 10. Further, for example, history manager 152 stores the passage history information in history DB 153, and transmits the passage history information to passage history management server 17. For example, in a railway network, history manager 152 may manage local passage history information per one station (or one ticket gate).

Passage history management server 17 stores and manages, for example, information (passage history information) indicating a history of a person who has passed through gate 10. For example, passage history management server 17 may manage the passage history information on a plurality of gates 10. For example, in a large facility in which a plurality of entrance/exits, the passage history information on gate 10 installed at each of the plurality of entrance/exits may be aggregated and managed by passage history management server 17. Further, for example, in the railway network, the passage history information on each of gates 10 installed at the ticket gates of the plurality of stations may be aggregated and managed by passage history management server 17.

Note that, for example, passage management functional unit 15 may output information related to the passage management (passage management information) to a display apparatus (not illustrated). The passage management information may include, for example, information output by face authentication functional unit 13 and information output by person position estimator 14. The display apparatus may display, for example, the state of a person (for example, a result of face authentication of the person and the moving direction). For example, the display apparatus may display a right image and/or a left image, and superimpose the detected face frame on the right image and/or the left image. In addition, the display apparatus may display, for example, information (for example, the ID of the person) related to the person obtained by face authentication by superimposing the information on the right image and/or the left image.

Face authentication functional unit 13 described above may operate synchronously or asynchronously with passage management functional unit 15, for example. In the case of asynchronous operation, for example, face authentication functional unit 13 may operate when a face frame is detected by camera controller 131.

Each of the three configurations of face authentication functional unit 13, person position estimator 14, and passage management functional unit 15 described above may have a form of one information processing apparatus (for example, a server apparatus), or two or more of the three configurations may be included in one information processing apparatus. For example, face authentication functional unit 13 may have a form of one information processing apparatus, and person position estimator 14 and passage management functional unit 15 may be included in one information processing apparatus. In addition, at least one of face authentication functional unit 13, person position estimator 14, and passage management functional unit 15 in the form of an information processing apparatus may be included in gate 10.

The above-described information processing apparatus may include a processor, a memory, and an input/output interface used to transmit various types of information. The processor is an arithmetic apparatus such as a Central Processing Unit (CPU) or a Graphics Processing Unit (GPU). The memory is a memory apparatus implemented using a Random Access Memory (RAM), a Read Only Memory (ROM), and the like. The processor, the memory, and the input/output interface are connected to a bus, and exchange various kinds of information via the bus. The processor realizes functions of the configurations included in the information processing apparatus by, for example, loading a program, data, or the like stored in the ROM onto the RAM and executing processes.

In above-described person position estimator 14 and passage management functional unit 15, for example, a region (or zone) may be defined for gate 10, and person detection and passage management may be performed based on the defined zone. One example of the zone defined for gate 10 is described below.

<Gate Region Management>

Figure 3A:
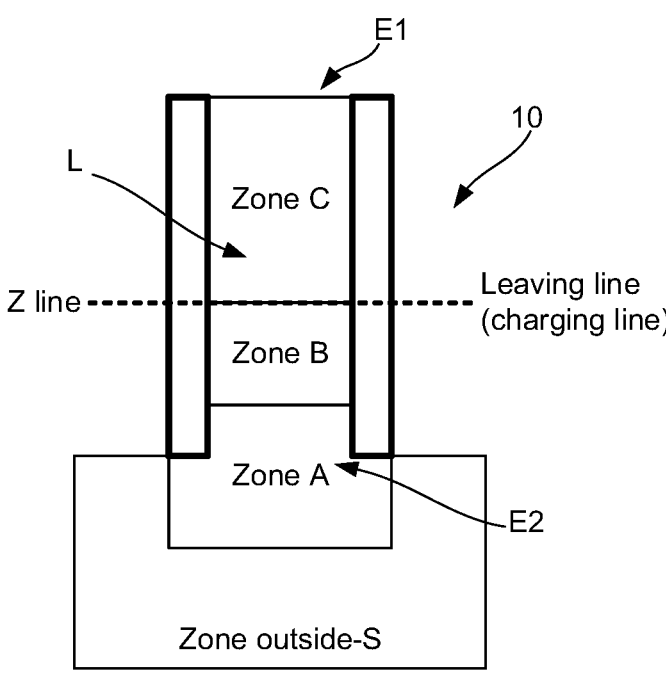
FIG. 3A is a diagram illustrating an example of a zone defined for a gate.
Figure 3B:
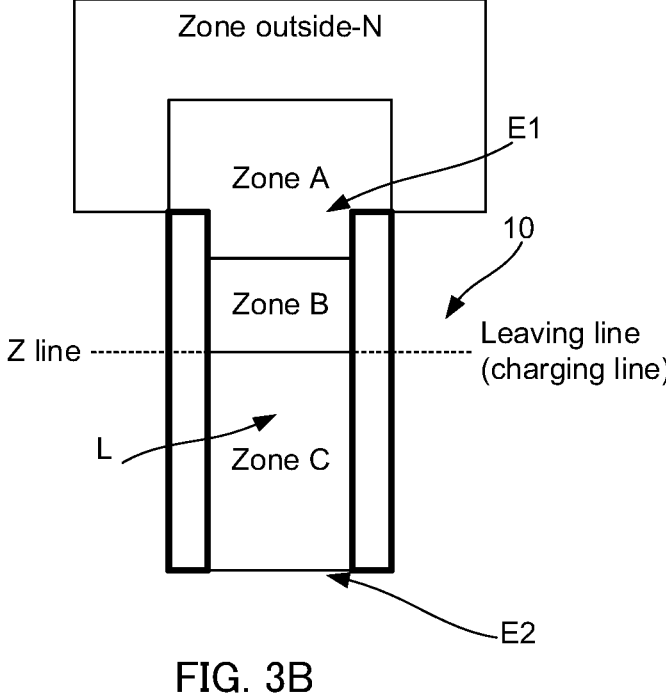
FIG. 3B is a diagram illustrating an example of a zone defined for a gate.

FIGS. 3A and 3B illustrate exemplary zones defined for gate 10. FIGS. 3A and 3B illustrate an example of a plurality of zones for gate 10 as seen from above in a bird's-eye view. In FIGS. 3A and 3B, side walls V of gate 10 forming path L extend along the upper-lower direction in the plane of the figure.

As illustrated in FIG. 1, one of entrance/exits E1 and E2 of gate 10 on the an upstream side, for example, along a particular entry direction (for example, an entering direction) corresponds to an entrance, and one of the entrance/exits on a downstream side corresponds to an exit.

FIG. 3A illustrates exemplary zones for gate 10 where the person can enter through both entrance/exits E1 and E2, which zones are defined for a case where a person enters through entrance/exit E2. In addition, FIG. 3B illustrates exemplary zones defined for a case where a person enters through entrance/exit E1.

In a case where gate 10 is bidirectionally enterable, it is conceivable that whether the moving direction is a normal direction or not is different depending on the entrance/exit to enter. For example, the moving direction of the person from entrance/exit E1 toward entrance/exit E2 is the normal moving direction for a person who has entered through entrance/exit E1, while not for a person who has entered through entrance/exit E2. With respect to such a difference in definitions, entrance/exit E1 is defined as "North side," and entrance/exit E2 is defined as "South side" in the passage management function, for example.

Note that the expressions of the north side and the south side are merely examples, and the present disclosure is not limited to these expressions. For example, the expressions, "north side" and "south side," do not limit the placement of gate 10 to placement along the geographical north-south direction. For example, in a case where path L of gate 10 is located along a direction different from the north-south direction, or in a case where a curve is included in the path, one side may be defined as the "north side" and the other side may be defined as the "south side."

For example, FIG. 3A illustrates the exemplary zones defined for a case where a person enters through entrance/exit E2. In FIG. 3A, "Zone outside-S" (southern outer-zone area), "Zone A," "Zone B," and "Zone C" are defined for gate 10.

In contrast, FIG. 3B illustrates the exemplary zones defined for a case where a person enters through entrance/exit E1. In FIG. 3B, "Zone outside-N" (northern outer-zone area), "Zone A," "Zone B," and "Zone C" are defined for gate 10.

In the following, the zones will be described with reference to the example of FIG. 3A. Note that FIG. 3B is similar to FIG. 3A except that the person enters through entrance/exit E1 and that the "Zone outside-S" (southern outer-zone area) is replaced with "Zone outside-N" (northern outer-zone area).

The boundary between the southern outer-zone area and zone A may be referred to as a "face authentication start line," for example.

The "face authentication start line" is used, for example, to determine whether or not to start the face authentication process. For example, when a person enters gate 10 beyond the "face authentication start line," the face authentication process is started. For example, the face collation request is issued from the face frame information, the collation result (face authentication ID) is linked with the person detection information, and tracking of the person is started. Note that the "face authentication start line" may be referred to as an "A LINE."

The "face authentication start line" may be disposed outside gate 10 (e.g., on the upstream side along the path of gate 10). The "face authentication start line" is not limited to one line segment, and may include a plurality of line segments, for example, as a squarish U-shape. Note that the shape having a plurality of line segments is not limited to such a shape as the U-shape corresponding to a part of sides of a rectangular shape, and may be a shape corresponding to a part of sides of another polygonal shape. Alternatively, the "face authentication start line" may have an arc, or may have a shape in which a straight line and a curved line are mixed. For example, when the "face authentication start line" has a plurality of line segments and/or arcs, the face authentication process can be started when a person enters not only from the front but also in a direction deviated from the front, such as from the lateral side of gate 10.

The boundary between zone A and zone B may be referred to as a "door closure limit line," for example.

The "door closure limit line" indicates, for example, such a position that the exit-side gate door can be closed in time in response to a closing instruction before the person passes the position of the exit-side gate door. The "door closure limit line" is determined by considering, for example, a maximum speed assumed as a speed at which a person passes through gate 10 (e.g., 6 km/h; hereinafter referred to as "maximum passable speed") and a time required to physically close the gate door (e.g., 0.5 seconds). For example, the "door closure limit line" is set in front of the position of the physical gate door ("gate door position") by a distance corresponding to "maximum passage speed" x "time required for physically closing the gate door." By setting the "door closure limit line" as described above, when a person who is not permitted to pass through gate 10 passes the "door closure limit line" and moves at the maximum passable speed, the exit-side gate door can be closed before the person passes through the exit-side gate door.

Note that the "door closure limit line" may be referred to as "unauthorized intrusion detection line" or "B LINE." The boundary between zone B and zone C may be referred to as a "leaving line."

The "leaving line" indicates, for example, a position at which the person is determined to have left gate 10. The "leaving line" may be disposed outside gate 10, for example, in the same manner as the "face authentication start line" described above.

Further, the "leaving line" is not limited to one line segment, for example, and may have a plurality of line segments, like a squarish U-shape. Alternatively, the "leaving line" may have an arc. Note that the "leaving line" may be referred to as "Z LINE," for example.

In the passage management, the gate door position may be a mere passage point, and in this case, the gate door position may be different from or the same as the logically set "leaving line." For example, in actual operation, the "gate door position" and the "leaving line" may be set to be the same.

For example, in the case of gate 10 that charges a passing person, the "leaving line" may correspond to a "charging line."

For example, when a person who has entered gate 10 passes the charging line (for example, when the person enters zone C from zone B), the person is charged. In other words, at a stage where the person has not passed the charging line (for example, a stage where the person does not enter zone C), the person is not charged. By providing this charging line, it is possible to avoid an error of charging a person who has entered gate 10 but has returned before passing the charging line.

In the above description, an example in which the "charging line" corresponds to the "Z line" (the "leaving line") has been described, but for example, the "charging line" may correspond to the "B line."

Note that, in the above example, an example in which three zones are defined except for the northern outer-zone area and the southern outer-zone area has been described, but the present disclosure is not limited thereto. The number, size, position, and shape of the zones may vary depending on the situation to which the present disclosure applies.

By detecting the position of a person with respect to the zones described above, for example, the movement between the zones is estimated. In the present embodiment, the position of the person is estimated using, for example, images captured by right camera 11 and left camera 11.

Figure 4:
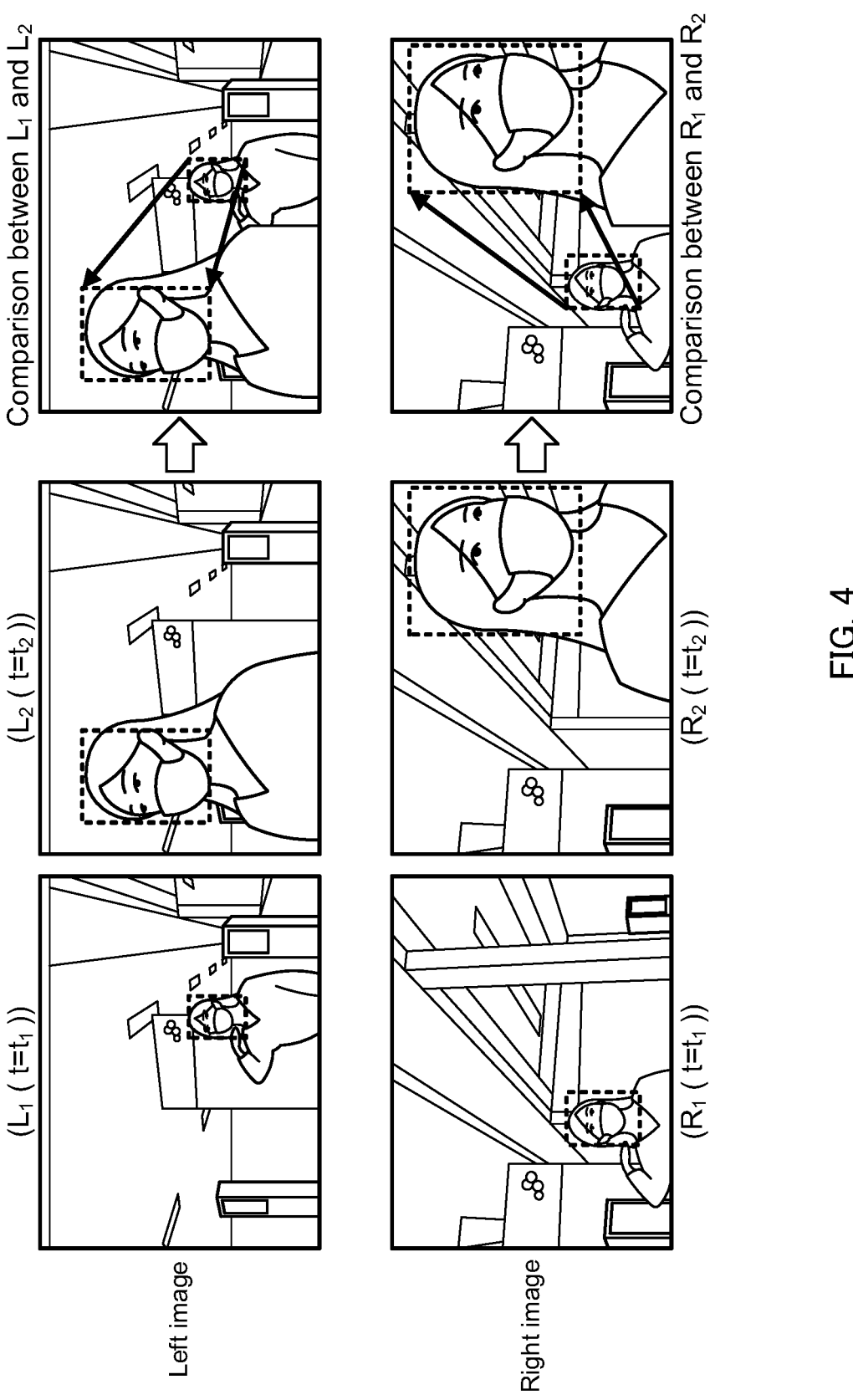
FIG. 4 is a diagram illustrating an example of detection of a face frame according to an embodiment.

FIG. 4 is a diagram illustrating an example of detection of a face frame in the present embodiment. FIG. 4 illustrates right images $R_1$ and $R_2$ captured by right camera 11 and left images $L_1$ and $L_2$ captured by left camera 11. Right image $R_1$ and left image L1 are, for example, images captured at same time $t_1$. Right image $R_2$ and left image $L_2$ are, for example, images captured at same time $t_2$. Time $t_2$ is a time after time $t_1$. For example, the position of the person in time $t_2$ is closer to the charging line of gate 10 than the position of the person in time $t_1$.

Right image $R_1$, right image $R_2$, left image $L_1$, and left image $L_2$ include, for example, the person passing through gate 10 and a frame (face frame) surrounding the face of the person.

For example, when left image $L_1$ is compared with left image $L_2$, the face frame in left image $L_2$ is closer to a left end portion of the image region than the face frame in left image $L_1$. When right image $R_1$ is compared with right image $R_2$, the face frame in right image $R_2$ is closer to a right end portion of the image region than the face frame in right image $R_1$.

In other words, for example, the position of the person can be detected by checking the positional relation between the face frame in the left image and the face frame in the right image (for example, the positional relation in the left-right direction in the image region). Hereinafter, the left-right direction in the image region is defined as a horizontal direction or an X-axis direction.

Figure 5A:
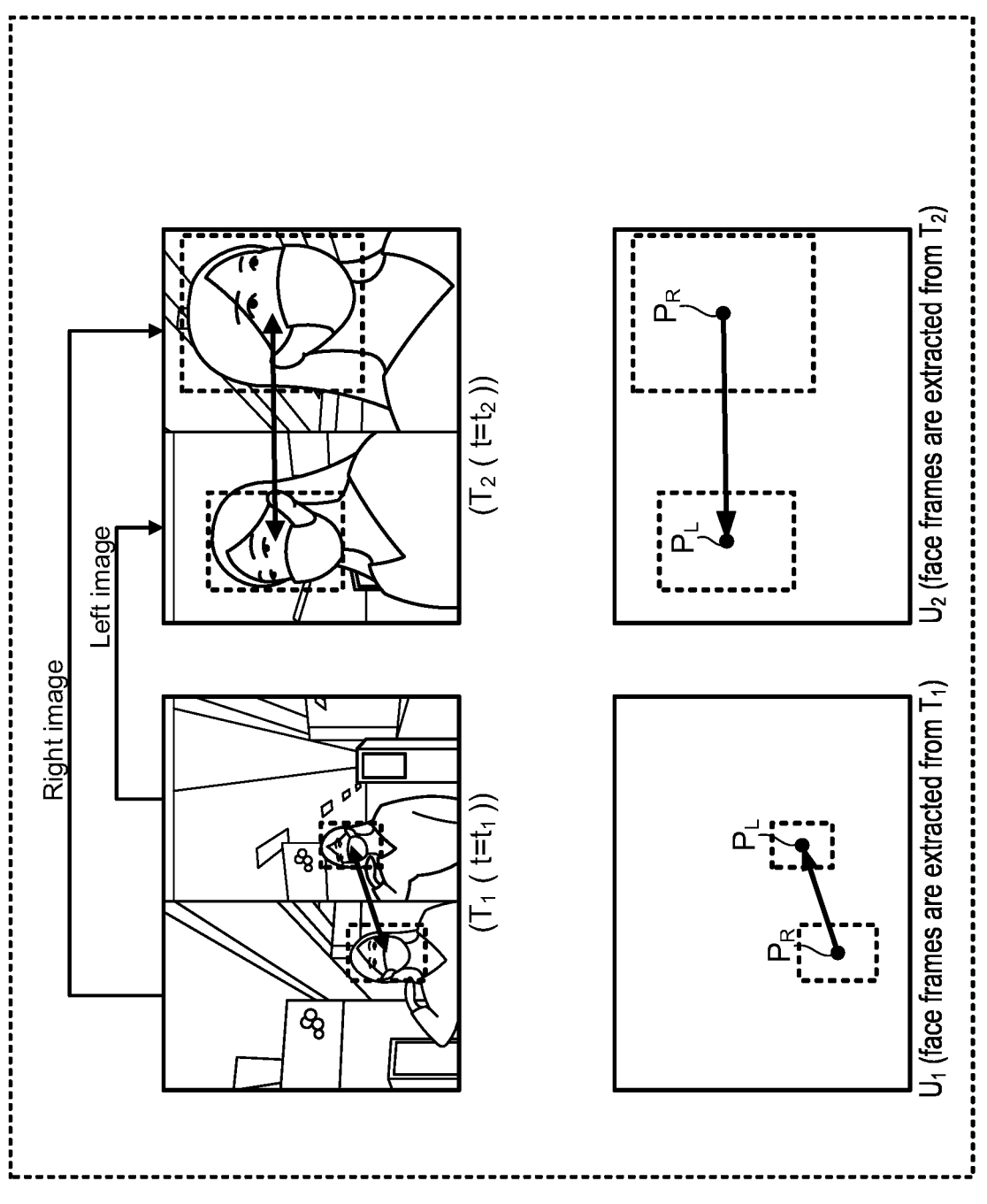
FIG. 5A is a diagram illustrating an example of detection of a position of a person according to an embodiment.

FIG. 5A is a diagram illustrating exemplary detection of a position of a person according to the present embodiment. FIG. 5A illustrates two images based on the images illustrated in FIG. 4 and extracted images obtained by extracting face frames from the two images.

Image $T_1$ of FIG. 5A illustrates an example of a comparison of the positional relation between the face frames of left image $L_1$ and right image $R_1$ in time $t_1$ illustrated in FIG. 4. For example, the right side of image $T_1$ indicates a partial region including the face frame in left image $L_1$ illustrated in FIG. 4, and the left side of image $T_1$ indicates a partial region including the face frame in right image $R_1$ illustrated in FIG. 4. In image $T_1$, the face frame in left image $L_1$ is located on the right side of the face frame in right image $R_1$.

Image $T_2$ of FIG. 5A illustrates an example of a comparison of the positional relation between the face frames of left image $L_2$ and right image $R_2$ in time $t_2$ illustrated in FIG. 4. For example, the right side of image $T_2$ indicates a partial region including the face frame in right image $R_2$ illustrated in FIG. 4, and the left side of image $T_2$ indicates a partial region including the face frame in left image $L_2$ illustrated in FIG. 4. In image $T_2$, the face frame in left image $L_2$ is located on the left side of the face frame in right image $R_2$.

As illustrated in FIG. 5A, in the right image and the left image captured at the same time, the positional relation between the face frame in the right image and the face frame in the left image changes according to the position of the person. Therefore, in the present embodiment, the position of the person is estimated based on a difference between the position of the face frame in the right image and the position of the face frame in the left image.

For example, the positions of the face frames are represented by representative points of the face frames. Hereinafter, an example in which the representative points are the center points of the face frames will be described. Since the center points of the face frames do not change greatly according to a difference in size of the faces, the position of the person can be stably estimated by using the center points of the face frames as the representative points even when the sizes of the face of the person vary. However, the present disclosure is not limited thereto. When the face frames are rectangular, the representative points may be points indicating corners of the rectangles. When the face frames are elliptical, the representative points may be focal points of the ellipses.

As illustrated in extracted images $U_1$ and $U_2$, the distance between point PR indicating the center of the face frame in the right image and point $P_L$ indicating the center of the face frame in the left image may be represented by, for example, the horizontal component (component along the X-axis) of the vector from point $P_R$ starting from point $P_R$ to point $P_L$. Hereinafter, the distance between point $P_R$ of the face frame in the right image and point $P_L$ of the face frame in the left image may be referred to as a horizontal-coordinate position difference or a position difference.

For example, since point $P_R$ is to the left of point $P_L$ in extracted image $U_1$, the horizontal component of the vector has a positive value. Further, since point $P_R$ is to the right of point $P_L$ in extracted image $U_2$, the horizontal component of the vector has a negative value.

FIG. 5B is a diagram illustrating an exemplary relation of the size and the center of the face frame with respect to the position of the person. FIG. 5B illustrates the relationship among the positional relation between the centers of the face frames, the size of the face frame, and the direction of the vector defined by the centers of the face frames with respect to three differences in distance (distant, intermediate, and close) from the charging line of gate 10.

As illustrated in FIG. 5B, comparison between the center of the face frame in the right image and the center of the face frame in the left image in the image region shows that in a case where the distance from the charging line is long, the center of the face frame in the right image is present to the left and the center of the face frame in the left image is present to the right. The closer to the charging line, the more the center of the face frame in the right image moves to the right, and the center of the face frame in the left image moves to the left. Therefore, the direction of the vector starting from the center of the face frame in the right image to the center of the face frame in the left image changes from the positive direction to the negative direction. That is, the polarity of the distance in the horizontal direction from the center of the face frame in the right image to the center of the face frame in the left image is reversed.

By comparing the position difference with a threshold, the position of the person is estimated. For example, when the position difference is equal to or less than the threshold, it is determined that the person exists at a position beyond the charging line.

Alternatively, when a person passes through the gate, the position difference gradually decreases from a positive value and changes to a negative value. When the position difference changes from the positive value to the negative value (determined by the polarity), the positional relation between the face frame in the left image and the face frame in the right image is reversed. In other words, the face frame in the left image and the face frame in the right image cross each other when the position difference is zero. Therefore, when the position difference becomes zero, it may be determined that the person exists at the position beyond the charging line.

For example, the angle of view of the camera, the size of the gate, and the position of the charging line may be determined such that the position of the point (cross point) at which the face frame in the left image and the face frame in the right image cross each other coincides with the charging line.

The position of the point (cross point) at which the face frame in the left image and the face frame in the right image cross each other is unlikely to be affected by the sizes of the face frames (that is, the size of the face of the person), and therefore, when the position of the cross point corresponds to the charging line, the accuracy of determination of the charging line can be improved.

In addition, since estimation is performed by calculating the difference between the horizontal coordinates of the centers using the centers of the face frames, it is possible to avoid the influence of the difference in the sizes of the face frames due to the size of the face and/or the height, and it is possible to suppress or avoid a decrease in the estimation accuracy.

Figure 6A:
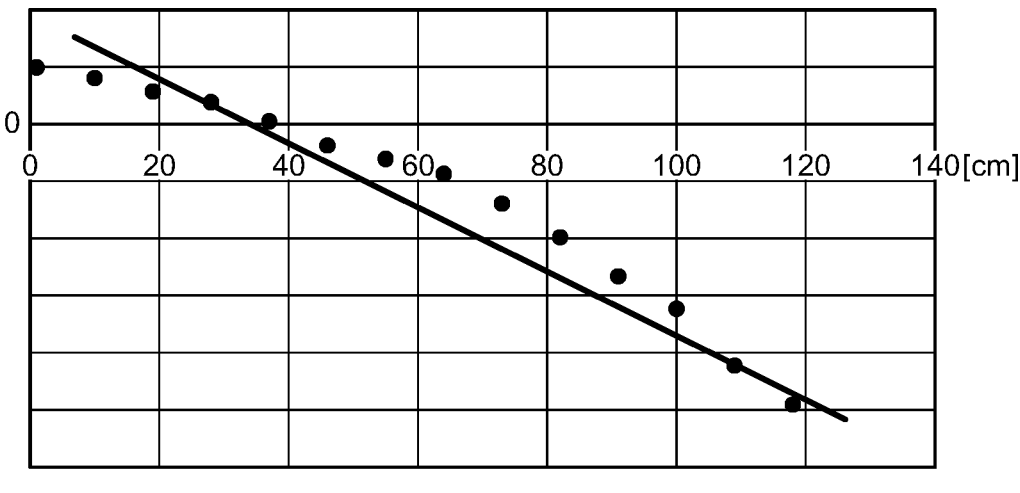
FIG. 6A illustrates a first example of a change in magnitude of a position difference.
Figure 6B:
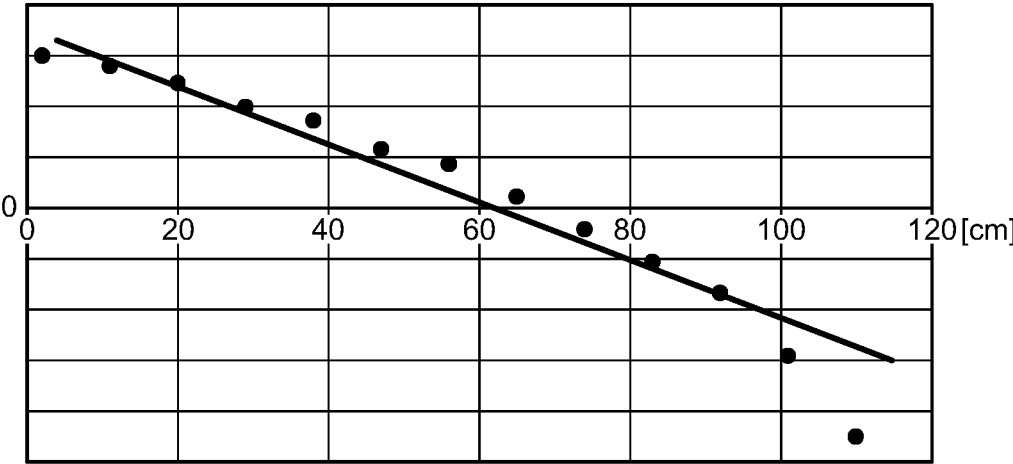
FIG. 6B illustrates a second example of a change in magnitude of a position difference.

FIG. 6A is a diagram illustrating a first example of a change in the magnitude of the position difference. FIG. 6B is a diagram illustrating a second example of the change in the magnitude of the position difference. The placement of right camera 11 and left camera 11 differs between FIGS. 6A and 6B. The horizontal axis in FIGS. 6A and 6B indicates the distance along the path from a position which is outside the entrance of gate 10 and where face authentication can be performed, and the vertical axis indicates the magnitude of the position difference. When the position difference is a positive value, the center of the face frame in the left image is located to the right of the face frame in the right image. When the position difference is a negative value, the face frame in the right image is located to the right of the face frame in the left image.

As illustrated in FIGS. 6A and 6B, the position difference takes zeros at certain positions. In addition, when FIGS. 6A and 6B are compared, the position at which the position difference is zero may differ depending on the arrangement of cameras 11.

As described above, when the charging line of gate 10 is defined, the position where the position difference becomes zero and the charging line can be caused to correspond to each other, for example, by adjusting the arrangement and/or the angles of cameras 11. Alternatively, since the position where the position difference becomes zero is defined by the arrangement of the cameras, the position of the charging line can be appropriately adjusted.

Figure 7:
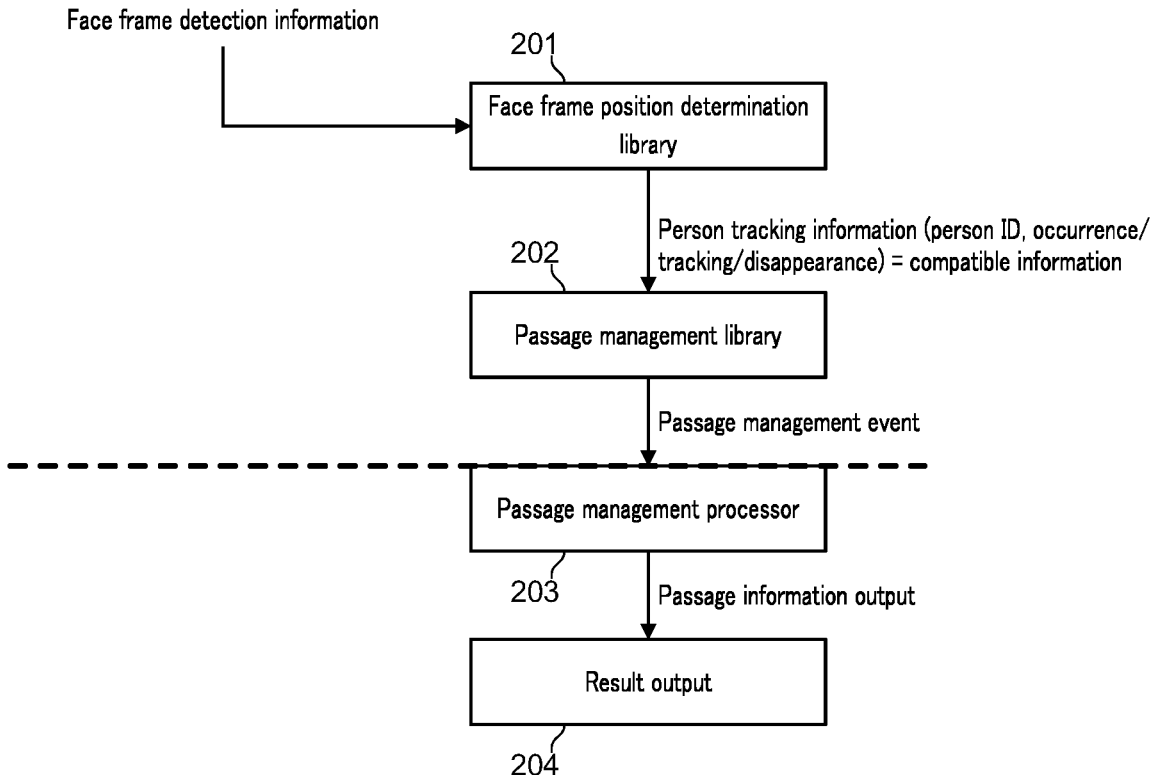
FIG. 7 is a diagram illustrating an example of a person tracking process based on the face frame in an embodiment.

Next, a process of person tracking based on the detected face frames will be described. FIG. 7 is a diagram illustrating an example of the person tracking process based on a face frame in the present embodiment.

Face frame position determination library 201 is, for example, a library having a function of acquiring face frame detection information and detecting a position of a person corresponding to the face frame. Face frame position determination library 201 detects the position of the person from the positions of the face frames in the image by, for example, the above-described method.

Face frame position determination library 201 may assign a new person ID to the face frame detection information, for example, when the acquired face frame detection information has no continuity with face frame detection information acquired in the past in terms of time and/or coordinate space.

In addition, for example, when the acquired face frame detection information is continuous with the face frame detection information acquired in the past in terms of time and/or coordinate space, face frame position determination library 201 continues tracking the person based on the face frame detection information having continuity.

Face frame position determination library 201 outputs, for example, person tracking information to passage management library 202.

The person tracking information may include, for example, a person ID for identifying the person. Also, the person tracking information may include, for example, information about the position of the person (for example, the occurrence of the person, the tracking of the person, the disappearance of the person, and the like). The person tracking information may be compatible, for example, between face frame position determination library 201 and passage management library 202.

Passage management library 202 has a function of specifying a passage management event in gate 10 based on, for example, the person tracking information. Further, passage management library 202 outputs, for example, the passage management event to passage management processor 203. The passage management event includes at least one of a plurality of events in a plurality of zones illustrated, for example, in FIGS. 3A and 3B, such as an event indicating that a person has moved between the zones, an event indicating that a person has passed a line between the zones, an event indicating that a person has appeared in a zone, and an event indicating that a person has disappeared in a zone.

Passage management processor 203 outputs, for example, passage information indicating whether or not a person has passed through gate 10 or whether or not the person has passed the charging line, based on the passage management event.

Result output 204 outputs, for example, a result of tracking of a person indicated by the passage information. For example, result output 204 displays the result on a display.

Next, areas defined for a face frame detected in the image will be described.

Figure 8:
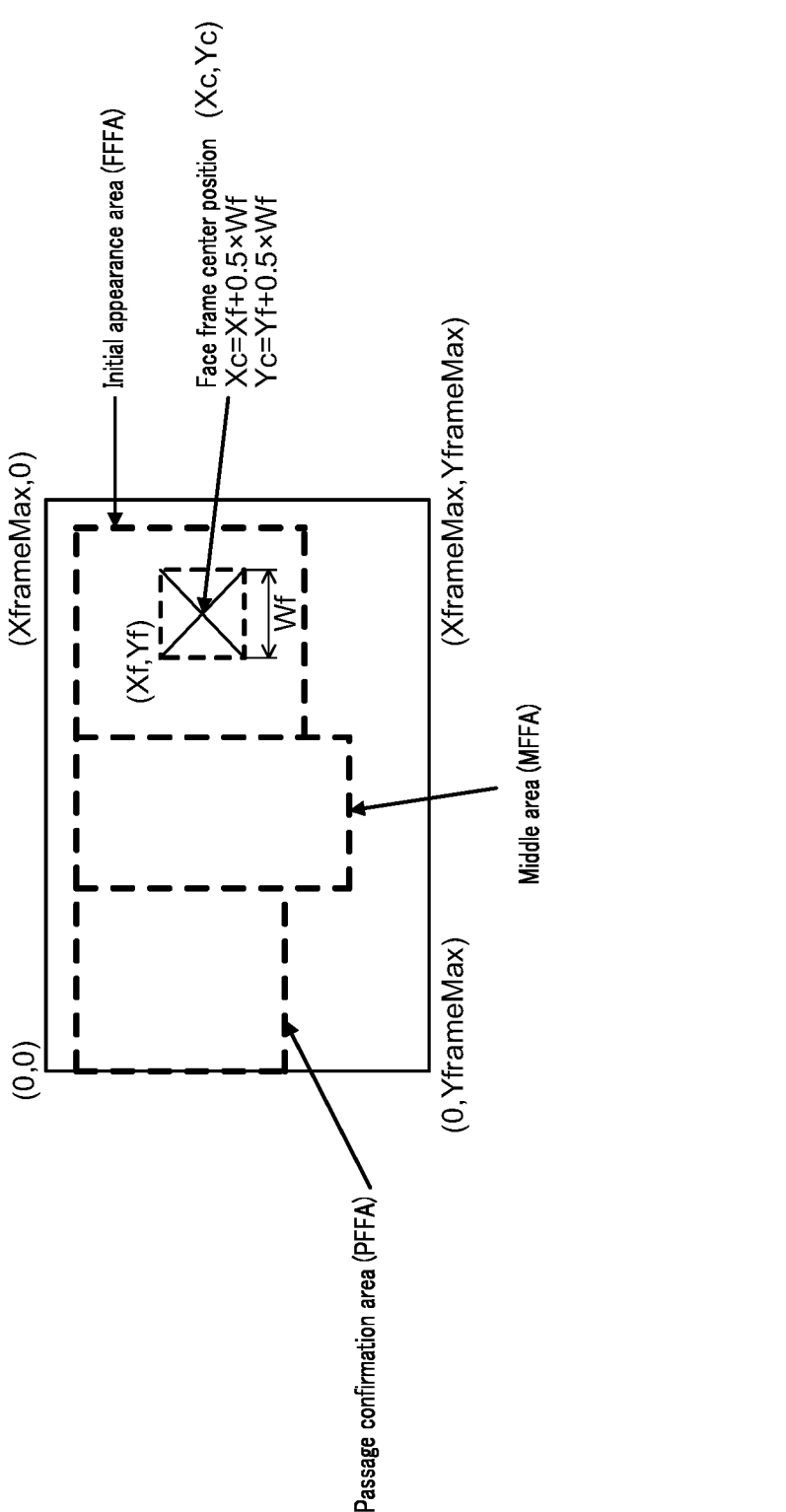
FIG. 8 illustrates an example of an area defined in an image region.

FIG. 8 is a diagram illustrating an example of the areas defined in an image region. FIG. 8 illustrates the image region in which the upper left is the origin (0, 0), the length of the frame in the horizontal direction (X-axis direction) is expressed as "XframeMax," and the length of the frame in the vertical direction is expressed as "YframeMax." In addition, FIG. 8 exemplarily illustrates a face frame in which the length of one side is wf and the coordinates of the upper left are (Xf, Yf), and the center (Xc, Yc) of the face frame. Note that, for example, as illustrated in FIG. 8, information indicating the face frame may be expressed by XY coordinates representing the upper left point of the face frame and wf representing one side of the face frame.

As illustrated in FIG. 8, three areas may be defined in the image region of a left image. For example, among the three areas, the right area represents an initial appearance area (First Face Frame Area (hereinafter, referred to as "FFFA")), the center area represents a middle area (Middle Face Frame Area (hereinafter, referred to as "MFFA")), and the left area represents a passage confirmation area (Passed Face Frame Area (hereinafter, referred to as "PFFA")).

Note that FIG. 8 illustrates three areas in the image region of the left image, and the left and right of the three areas may be reversed in the image region of the right image. In other words, in the image region of the right image, the left area may represent FFFA and the right area may represent PFFA. Further, the sizes and positions of the three areas of FIG. 8 are illustrative, and the present disclosure is not limited thereto. The sizes and positions of the three areas may vary between cameras 11.

For example, face frame position determination library 201 may determine, based on the face frame detection information, which of the three areas of the image region the center of the detected face frame is included in.

Figure 9:
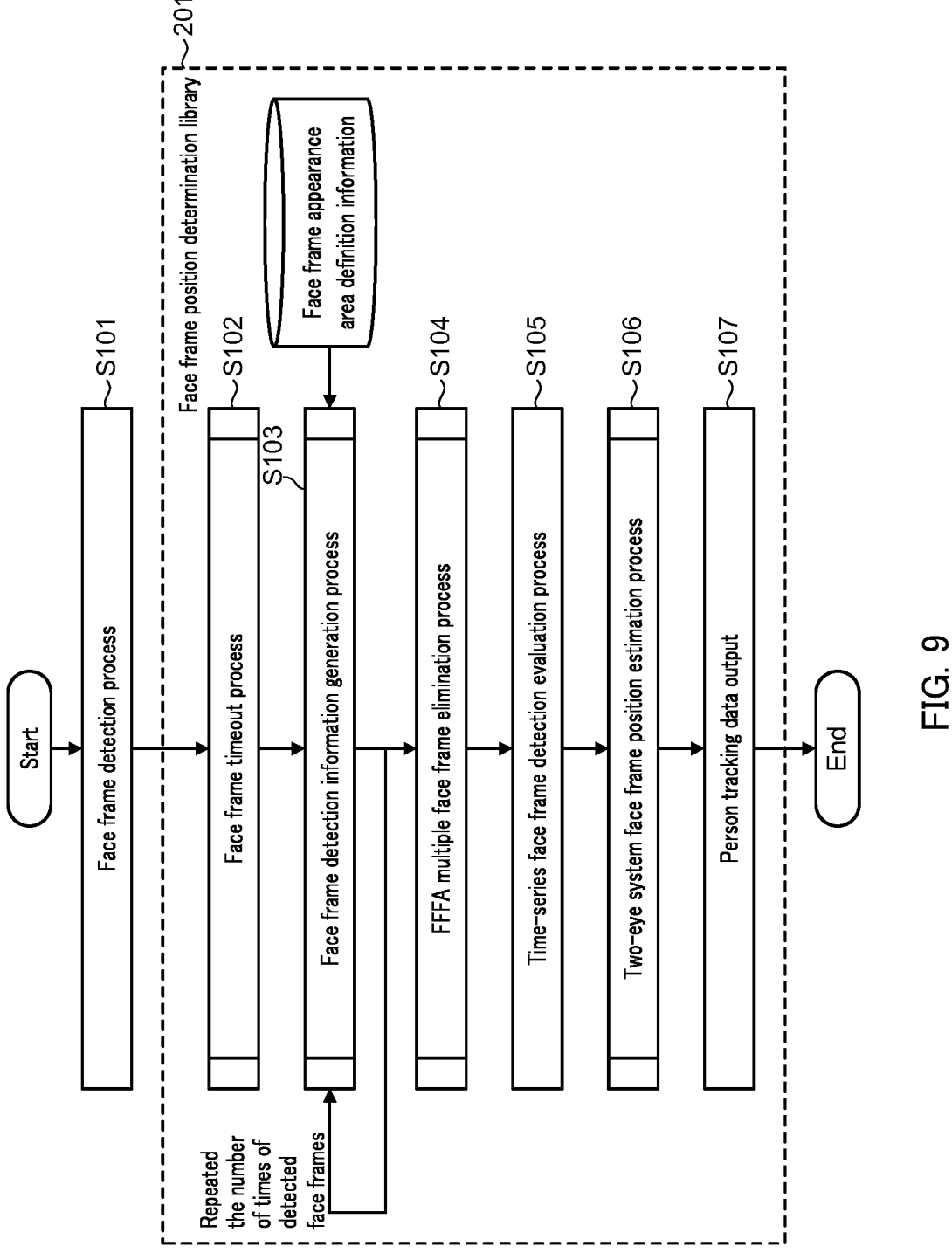
FIG. 9 is a flowchart illustrating an example of passage management.

FIG. 9 is a flowchart illustrating an example of the process of the passage management. The flowchart illustrated in FIG. 9 may be started every time information on an image captured by cameras 11 is acquired, for example.

Face authentication functional unit 13 acquires the information on an image captured by cameras 11, and performs a process of detecting a face frame from the image (S101). Note that the information on the image acquired from cameras 11 may include information identifying a camera having captured the image (hereinafter, referred to as a camera ID), information identifying the captured frame (hereinafter, referred to as a frame ID), an image-capturing date and time, and the like. Face authentication functional unit 13 generates information on the detected face frame, and outputs the information on the face frame and the information on the image to person position estimator 14. The information about the face frame may include information indicating the position and size of the face frame. If no face frame is detected from the image, the processes after S102 may not be executed.

Next, person position estimator 14 performs subsequent processing based on face frame position determination library 201.

Person position estimator 14 performs a face frame timeout process (S102). In the face frame timeout process, the timeout process is performed on the face frame detection information held in a face frame information list based on an elapsed time from a timing at which the face frame detection information is first acquired. The face frame timeout process will be described later.

Next, person position estimator 14 performs a face frame detection information generation process (S103). For example, in the face frame detection information generation process, face frame detection information including information on the camera ID, the frame ID, the image-capturing date and time, and the coordinates of the detected face frame is generated. In addition, the face frame detection information may include information about an area in which the face frame is detected. The area in which the face frame is detected is determined, for example, based on the definition of areas as illustrated in FIG. 8. The definition of the areas may be included in face frame appearance area definition information. When a plurality of face frames are detected in one image, the face frame detection information generation process is executed for each of the plurality of face frames. The face frame detection information generation process will be described later.

Next, person position estimator 14 performs a FFFA multiple face frame elimination process (S104). In the FFFA multiple face frame elimination process, it is determined whether or not a plurality of face frames exist in the FFFA, and when a plurality of face frames exist in the FFFA, the subsequent process is not executed. The FFFA multiple face frame elimination process will be described later.

Person position estimator 14 performs a time-series face frame detection evaluation process (S105). In the time-series face frame detection evaluation process, the face frame detection information is evaluated by comparing the latest information in a face frame detection table with information immediately preceding the latest information. For example, when the face frame indicated by the face frame detection information is a face frame of a person who newly appears, a new ID is assigned to the person.

Next, person position estimator 14 performs a two-eye system face frame position estimation process (S106). The person tracking information is generated by the two-eye system face frame position estimation process. Note that the two-eye system face frame position estimation process will be described later.

Next, person position estimator 14 outputs person tracking data to passage management functional unit 15 (S107). Then, the process in FIG. 9 ends, and passage management functional unit 15 performs the passage management process based on the passage management library.

<Face Frame Detection Information Generation Process>

In the face frame detection information generation process (S103), the detection position of the face frame is determined. For example, for each of the right image and the left image, it is determined in which of the areas defined in the image region the position of the detected face frame is included.

For example, one face frame is extracted from the information on the face frame. The center of the extracted face frame is calculated, and it is determined in which of the FFFA, MFFA, and PFFA the center is present.

For example, in a case where the center of the face frame does not exist in any area, the information on the face frame is discarded. This is because it is highly likely that the face frame is of an unauthorized person in the case where the center of the face frame does not exist in any area.

When the center of the face frame exists in any of the three areas, the minimum face frame size set for the area in which the face frame exists is compared with the size of the face frame. In a case where the size of the face frame is smaller than the minimum face frame size, the information on the face frame is discarded. This is because in the case where the size of the face frame is smaller than the minimum face frame size, it is highly likely that the face frame is of an unauthorized person, such as a face of a person unlikely to enter gate 10, or a face drawn on clothes or a poster, or a pattern or the like that is not a face but erroneously detected as a face.

When a plurality of face frames are detected in one image, the above-described determination of the area where the face frame is present and comparison with the minimum face frame size set for the area where the face frame is present are performed for each of the plurality of face frames.

A list for performing the time-series determination process may be generated from the face frame detection information. The generated list may be referred to as a face frame information list (or a Queue structure list).

The face frame information list may include the center coordinates of the face frame and information on an appearance area in the image region.

<Face Frame Timeout Process>

Figure 10:
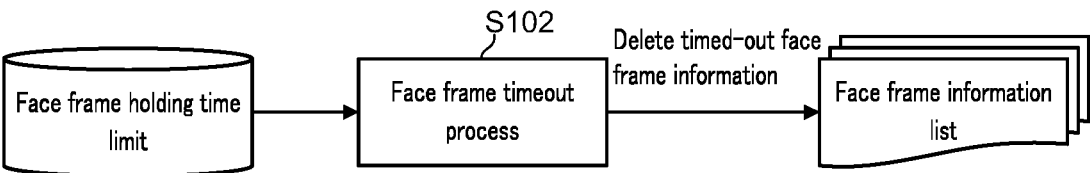
FIG. 10 illustrates an example of a face frame timeout process.

Next, the face frame timeout process (S102) will be described. FIG. 10 is a diagram illustrating an example of the face frame timeout process.

In the face frame timeout process (S102), a holding time between, on one hand, the time at which the face frame as a determination target is first detected, for example, the time at which the face frame as the determination target first appears and a new ID is attached to the face frame and, on the other hand, the image-capturing time at which the image including the face frame as the determination target is captured is compared with a time limit for holding the face frame (face frame holding time limit). Note that the holding time may be determined with reference to the face frame information list, for example. In addition, the face frame holding time limit is a threshold defined in advance, and is held in a storage or the like.

For example, in the face frame timeout process, when the holding time for the information on the face frame to which the ID is attached becomes equal to or longer than the time limit, the information on the face frame is deleted from the face frame information list.

This process makes it possible to avoid that information on a person whose face frame is detected but who does not pass through gate 10 and moved out of the imaging range of cameras 11 remains in the list.

Although FIG. 9 illustrates the example in which the face frame timeout process is executed before the face frame detection information generation process, the present disclosure is not limited to this. In the face frame timeout process, it may be always checked whether or not a timeout has occurred with respect to the face frame information.

<FFFA Multiple Face Frame Elimination Process>

Figure 11:
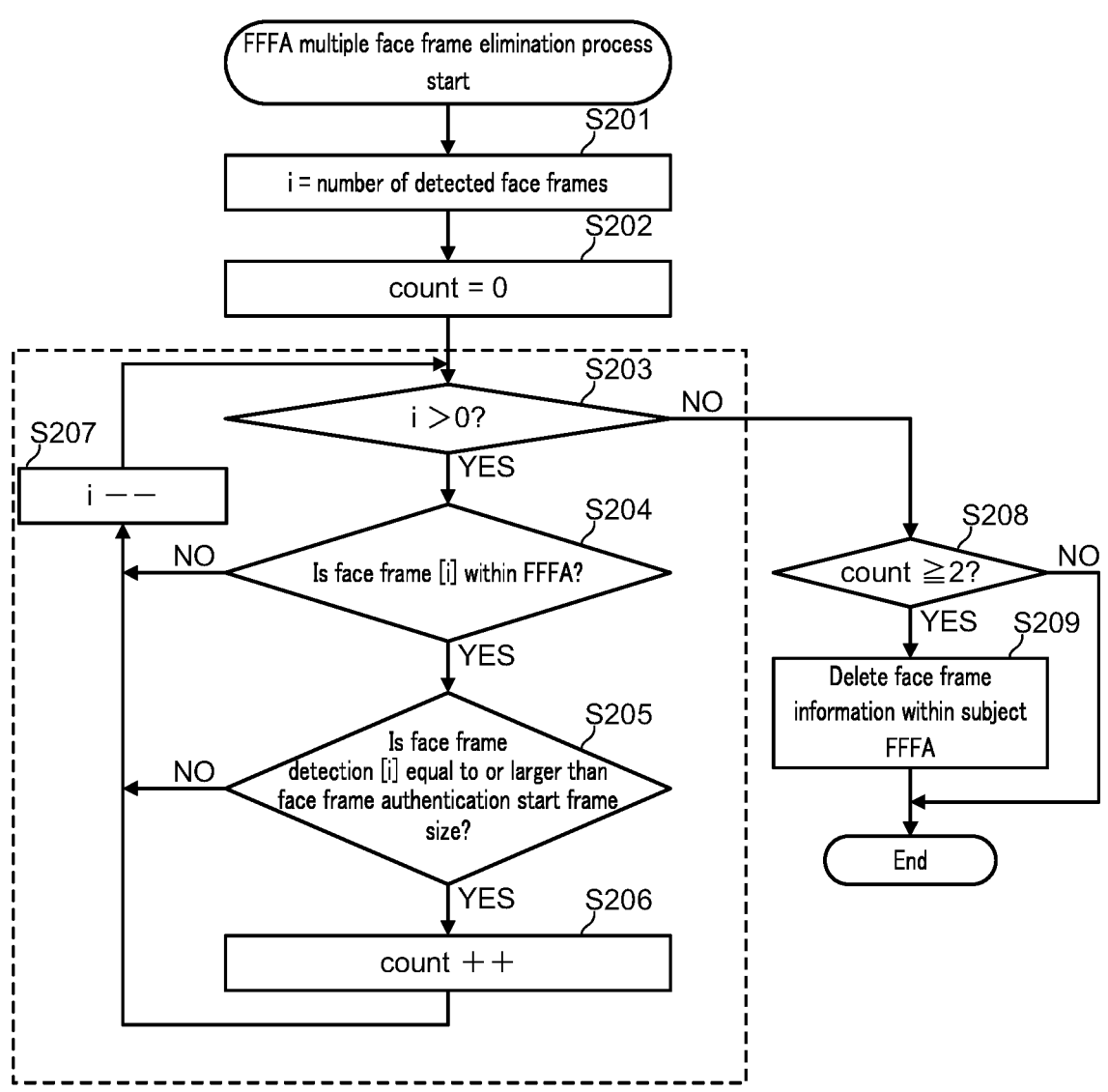
FIG. 11 is a flowchart illustrating an exemplary FFFA multiple face frame elimination process.

Next, the FFFA multiple face frame elimination process (S104) will be described. FIG. 11 is a flowchart illustrating an exemplary FFFA multiple face frame elimination process. For example, the process illustrated in FIG. 11 is started after S103 illustrated in FIG. 9.

In the initial setting, person position estimator 14 sets variable i to the number of detected face frames (S201). In FIG. 11, i is an integer equal to or greater than 1. In the following, a case where the number of detected face frames is N (N is an integer equal to or greater than 1) will be described. In this case, N detected face frames are represented as face frames [1] to [N].

Person position estimator 14 sets the variable, "count," to 0 (S202).

Person position estimator 14 determines whether or not i is greater than 0 (S203).

If i is greater than 0 (YES in S203), person position estimator 14 determines whether or not face frame [i] is detected in the FFFA (S204).

When face frame [i] is detected in the FFFA (YES in S204), person position estimator 14 determines whether or not the size of face frame [i] is equal to or larger than a predetermined size (S205). The predetermined size may be, for example, a size of a face frame allowing face authentication to be started, or a size that is defined based on the size of the face frame allowing face authentication to be started.

When the size of face frame [i] is equal to or larger than the predetermined size (YES in S205), person position estimator 14 adds 1 to "count" (S206).

Then, person position estimator 14 subtracts 1 from i (S207). Then, the process of S203 is executed.

When face frame [i] is not detected within the FFFA (NO in S204) or when the size of face frame [i] is not equal to or larger than the predetermined size (NO in S205), person position estimator 14 subtracts 1 from i (S207). Then, the process of S203 is executed.

When i is not greater than 0 (NO in S203), for example, when the processes of S204 to S206 are completed for each of the detected face frames, person position estimator 14 determines whether or not "count" is equal to or greater than 2 (S208).

When "count" is equal to or greater than 2 (YES in S208), that is, when there are two or more face frames with a size equal to or larger than the predetermined size within the FFFA, person position estimator 14 deletes the face frame information corresponding to the face frames within the FFFA (S209). Then, the process illustrated in FIG. 11 ends.

When "count" is not equal to or greater than 2 (NO in S208), that is, when two or more face frames with a size equal to or larger than the predetermined size are not present within the FFFA, person position estimator 14 may terminate the process without deleting the face frame information.

As described above, when a plurality of face frames having a size equal to or larger than the threshold of the face frame size for starting face authentication exist within the FFFA, the face authentication process is not executed for each of the detected face frames. When the face authentication process is not executed for each of the detected face frames, the information on the face frames corresponding to the face frames detected within the FFFA may be deleted. In this case, since the face authentication process cannot be executed, an error process is executed. For example, an output control process of a gate apparatus is instructed via the audio output apparatus and/or a display apparatus to present a warning message to a person who is going to pass through the gate device.

This process makes it possible to eliminate unauthenticated passage, even in a case where face frames of a plurality of persons are arranged in tandem and a plurality of persons attempt unauthenticated passage through the gate apparatus at the same time.

<Two-Eye System Face Frame Position Estimation Process>

Figure 12:
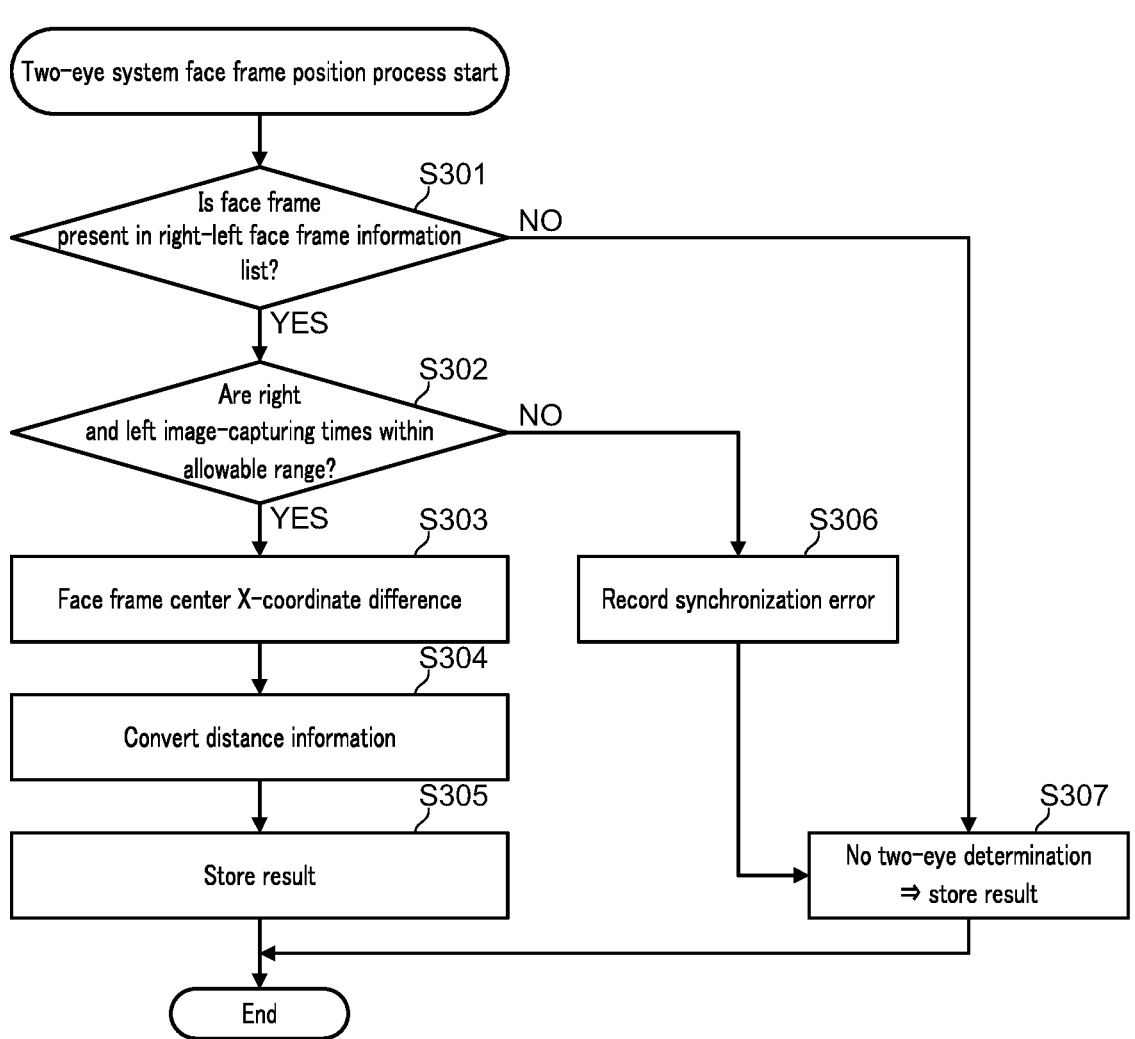
FIG. 12 is a flowchart illustrating an example of a two-eye system face frame position estimation process.

Next, the two-eye system face frame position estimation process (S106) will be described. FIG. 12 is a flowchart illustrating an example of the two-eye system face frame position estimation process. For example, the process illustrated in FIG. 12 is started after S105 illustrated in FIG. 9.

Person position estimator 14 determines whether or not a face frame exists in the face frame information list (S301).

When there is a detected face frame in the face frame information list (YES in S301), person position estimator 14 determines whether or not the difference between the image-capturing time at which the left image is captured by left camera 11 and the image-capturing time at which the right image is captured by right camera 11 is within an allowable range (S302). In other words, it is determined in S302 whether the image-capturing time for the left image and the image-capturing time for the right image are the same or substantially the same, or unacceptably different. In other words, it is determined whether or not the image-capturing time for the left image and the image-capturing time for the right image are synchronized.

When the difference between the image-capturing times is not within the allowable range (NO in S302), person position estimator 14 records a synchronization error in a log (S306).

When the difference between the image-capturing times is within the allowable range (YES in S302), person position estimator 14 calculates a difference between the X coordinate of the center of the face frame in the left image and the X coordinate of the center of the face frame in the right image (S303). The difference between the X coordinates of the centers of the face frames may be referred to as a "center coordinate difference value" hereinafter.

Then, person position estimator 14 converts the calculated difference into distance information (S304). For example, a conversion table may be used for this conversion. An example of the conversion table will be described later.

Person position estimator 14 stores a conversion result (S305). Then, the process ends.

When the detected face frame does not exist (NO in S301) or after the synchronization error is recorded (after S306), person position estimator 14 stores a result indicating that the position estimation has not been performed (S307). For example, information indicating "no two-eye determination" may be set for a result-stored area. Then, the process ends.

<Conversion Table>

Next, an exemplary conversion table used in S304 of FIG. 12 will be described.

For example, in the conversion table, the center coordinate difference value and the estimated position where the target person exists are recorded in association with each other. For example, information on numerical values stored in the conversion table may be recorded in units of pixels (for example, in units of one pixel). The difference value may have a negative number. Further, the estimated position where the target person is present may be represented by a distance from a reference point provided in gate 10, or may be represented by two-dimensional coordinates (for example, an X coordinate and a Y coordinate) from the reference point.

For example, the conversion table may be loaded on a memory in order to increase the speed of processing related to the passage management, for example.

In addition, when gate 10 is passable from opposite directions, the conversion table may be provided for each direction, for example.

The conversion table may be created when gate 10 is installed, or may be provided from the outside.

As described above, in the present embodiment, the center of the face frame indicating the region of the face in the right image of the face of the person captured from the right front of the person entering through the entrance of gate 10 and the center of the face frame in the left image of the face captured from the left front of the person are determined, and the position of the person in gate 10 is estimated based on the change in the positional relation between the center of the face frame in the right image and the center of the face frame in the left image. With this configuration, it is possible to improve the estimation accuracy of estimation of the position of the person who is going to pass the charging line of the gate.

Further, according to the present embodiment, the tracking process is performed by using the image captured by the cameras used in the face authentication process. Accordingly, the passage management process including the authentication process and the tracking process is performed. Thus, the cameras used in the authentication process can be used for both the tracking process and the tracking process without installing an apparatus (for example, a camera on a ceiling portion or the like) for the tracking process. Therefore, an increase in the introduction cost of the passage management can be suppressed, and the passage management system can be introduced without location restriction.

Further, according to the present embodiment, the position of the person is estimated based on the distance between the centers of the face frames acquired respectively from the left image and the right image. Thus, even when there is a difference in the installation position, the angle of view, the image quality, and the resolution between right camera 11 and left camera 11, the estimation can be performed. For example, in the case of stereo cameras, the distance to an object is measured using the parallax between both of the two cameras. Therefore, regarding the stereo cameras, it is necessary to precisely adjust the angles of both the cameras, and control processing dedicated to the stereo cameras is required. In the present embodiment, the position is estimated using the positional relation between the face frames detected in the face authentication process. Thus, the position can be estimated without strict adjustment of the cameras more easily than a method for the stereo cameras.

Note that the configuration described for the present embodiment is an example, and the present disclosure is not limited to this. A variation of the positions of cameras 11 installed in gate 10 will be described below.

FIG. 1 illustrates the example in which the distance from entrance/exit E1 of gate 10 to right camera 11 (camera 11-R1) is equal to the distance from entrance/exit E1 to left camera 11 (camera 11-L1), but the present disclosure is not limited thereto. For example, one of right camera 11 and left camera 11 may be installed at a position closer to entrance/exit E1 of gate 10 than the other. In other words, a difference occurs between the installation positions of right camera 11 and left camera 11 with respect to entrance/exit E1 of gate 10. Thus, a front-rear difference occurs between the image-capturing range of the right image and the image-capturing range of the left image.

For example, in a case where left camera 11 is installed at a position closer to entrance/exit E1 than right camera 11, it is highly likely that, in comparison of face frames of the left image and the right image, the face frame in the left image deviates out of the image region before the face frame in the right image and becomes undetectable. In such a case, the areas defined in the image region may be changed. In the following description, an example will be given in which left camera 11 is installed at a position closer to entrance/exit E1 than right camera 11.

Figure 13:
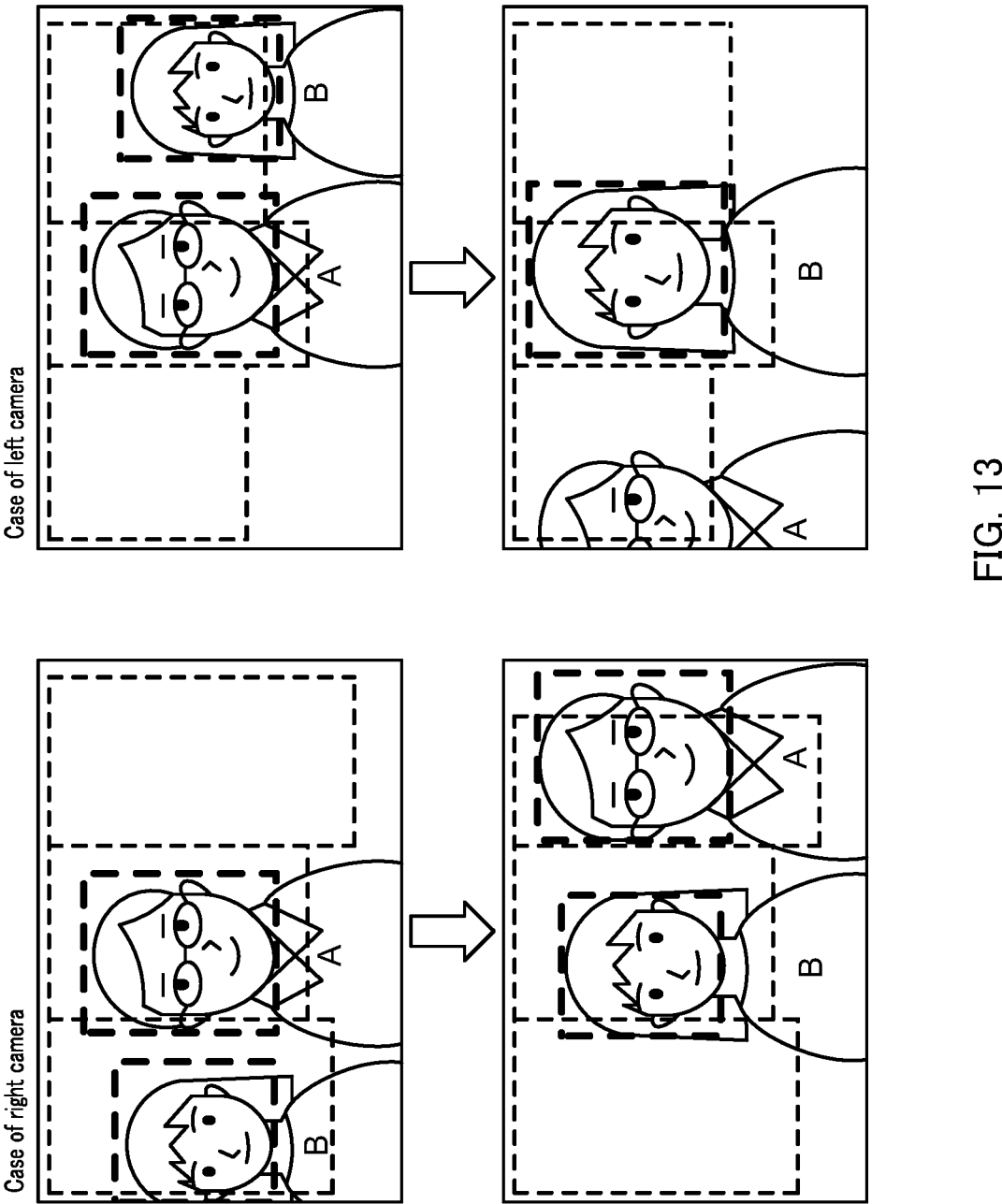
FIG. 13 is a diagram illustrating an example of defined areas with respect to a difference in arrangement of cameras.

FIG. 13 is a diagram illustrating an example of defined areas with respect to a difference in arrangement of cameras. FIG. 13 illustrates images captured by right camera 11 and left camera 11 at two time points, face frames detected in the images, and areas defined in the images.

Each of the images in FIG. 13 includes person A entering gate 10 and person B entering gate 10 from behind person A. As described above, when left camera 11 is installed at a position closer to entrance/exit E1 than right camera 11, the face frame of person A in the left image deviates from the image region before the face frame of person A in the right image. For example, in the example of FIG. 13, since the face frame of person A in the left image deviates out of the image region, there is a possibility of erroneously determining that the face frame of person B in the left image and the face frame of person A in the right image are of the identical person. Therefore, as illustrated in FIG. 13, the PFFA in the image of right camera 11 is set to be narrower horizontally than the PFFA in the image of left camera 11. By this setting, for example, the timing at which the center of the face frame deviates from the PFFA can be the same between the left image and the right image.

Control Example 1 in Case Where Image Cannot Be Acquired from One Camera

For example, in the above-described two-eye system, there may be a case where a face frame cannot be detected in an image captured by one of the two cameras. For example, the case where the face frame cannot be detected may include a case where the face frame detection process fails for an image captured by one camera or a case where a defect occurs in the image-capturing of one camera (for example, a failure or a temporary malfunction of the camera). Hereinafter, an example will be described in which, when a face frame cannot be detected in an image captured by one of the two cameras, the passage management is performed based on a face frame detected in an image captured by the other camera. Note that a processing system performed using an image captured by one camera may be referred to as a one-eye system.

For example, when the detection of the face frame fails in the left image captured by the left camera and the detection of the face frame succeeds in the right image captured by the right camera, the position of the person may be estimated based on the amount of movement of the face frame in the right image. This person position estimation process detects, for example, a face frame of a person who newly appears in time series to pass through gate 10. Hereinafter, an example of detection of a face frame of a new person will be described.

Figure 14:
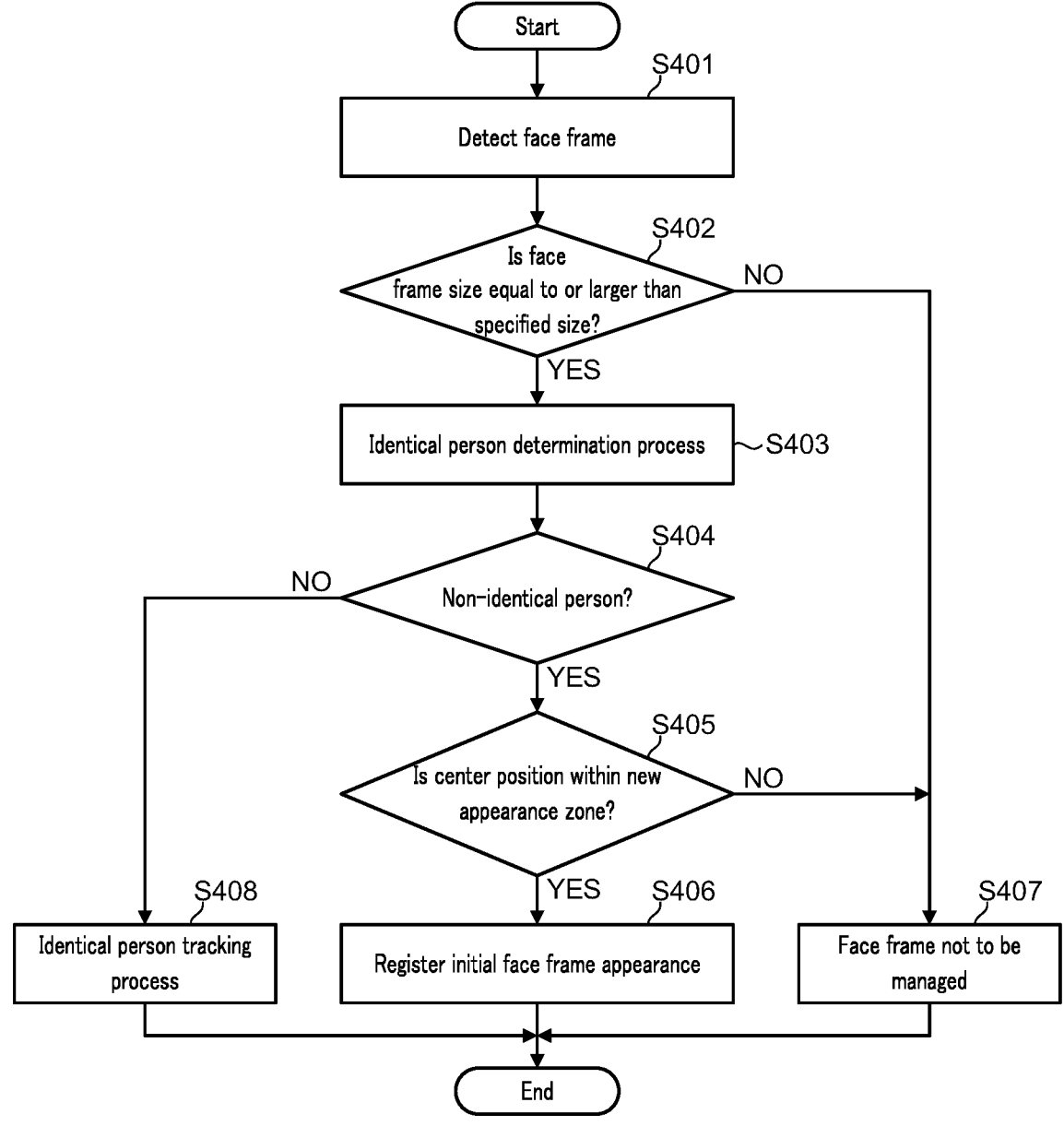
FIG. 14 is a flowchart illustrating an example of new face frame detection using one camera.

FIG. 14 is a flowchart illustrating an example of new face frame detection using one camera. The flowchart illustrated in FIG. 14 may be executed, for example, in a case where information on an image captured by either right camera 11 or left camera 11 is acquired while information on an image is not acquired from the other camera, or in a case where one of right camera 11 and left camera 11 fails to capture an image.

Face authentication functional unit 13 acquires the information on the image captured by camera 11, and performs a process of detecting a face frame from the image (S401).

Person position estimator 14 determines whether or not the size of the face frame is equal to or larger than a specified size (S402).

When the face frame size is equal to or larger than the specified size (YES in S402), person position estimator 14 performs an identical person determination process (S403). For example, person position estimator 14 determines whether or not an identical person to the person of the detected face frame is present among persons with face frames indicated in a past face frame information list. For example, this determination may be performed by comparing the feature points, as in the face authentication process.

As a result of the identical person determination process, person position estimator 14 determines whether or not the person is a non-identical person (S404).

When the person is the non-identical person (YES in S404), person position estimator 14 determines whether or not the center position of the detected face frame is included in a new appearance zone (for example, the FFFA) (S405).

When the center position of the detected face frame is included in the new appearance zone (YES in S405), person position estimator 14 determines that the detected face frame is the face frame of the person who newly appears, and registers the information on the face frame (S406). Then, the process ends.

In S406, for example, when the person corresponding to the detected face frame is different from persons corresponding to face frames detected so far and the detected face frame is in a zone in which it can be determined that the person newly appears, it is recognized that the face frame is a face frame of a new person. For example, the information may be registered in the face frame tracking management table. In this case, a face collation request may be indicated.

When the face frame size is not equal to or larger than the specified size (NO in S402) or when the center position of the detected face frame is not included in the new appearance zone (NO in S405), person position estimator 14 determines that the detected face frame is a face frame not to be managed (S407). Then, the process ends.

When the person is an identical person (NO in S404), person position estimator 14 executes the tracking process of tracking the identical person (S408). Then, the process ends.

In the above-described process, appearance of the initial face frame for the new person is determined when the center point of the face frame is in the new appearance zone. However, for example, when the face frame is detected continuously a predetermined number of times in the new appearance zone, it may be determined that the person corresponding to the detected face frame is the new person. By the determination based on continuous detection of the face frame, it is possible to avoid registering a face frame appearing once but disappearing a next time.

The identical person determination process is not particularly limited. For example, it may be determined from the movement amount of the face frame whether or not the person is the identical person. For example, a predetermined range of the movement amount set based on an image-capturing interval (a range in which a person can move for an image-capturing interval (for example, 60 msec)) may be compared with the movement amount of the face frame between two images, and when the movement amount of the face frame is within the predetermined range, it may be determined that the person is the identical person.

Control Example 2 in Case where Image Cannot be Acquired from One Camera

In the above-described example, the method of detecting a face frame of a newly appearing person in a case where the face frame is not detected in an image captured by one of the two cameras in the two-eye system (the system in which processes are performed using images captured by two cameras) has been described. In the following, an example will be described in which when a face frame is not detected in an image captured by one of the two cameras in the two-eye system, it is determined whether or not a person passing through gate has passed the charging line.

Figure 15:
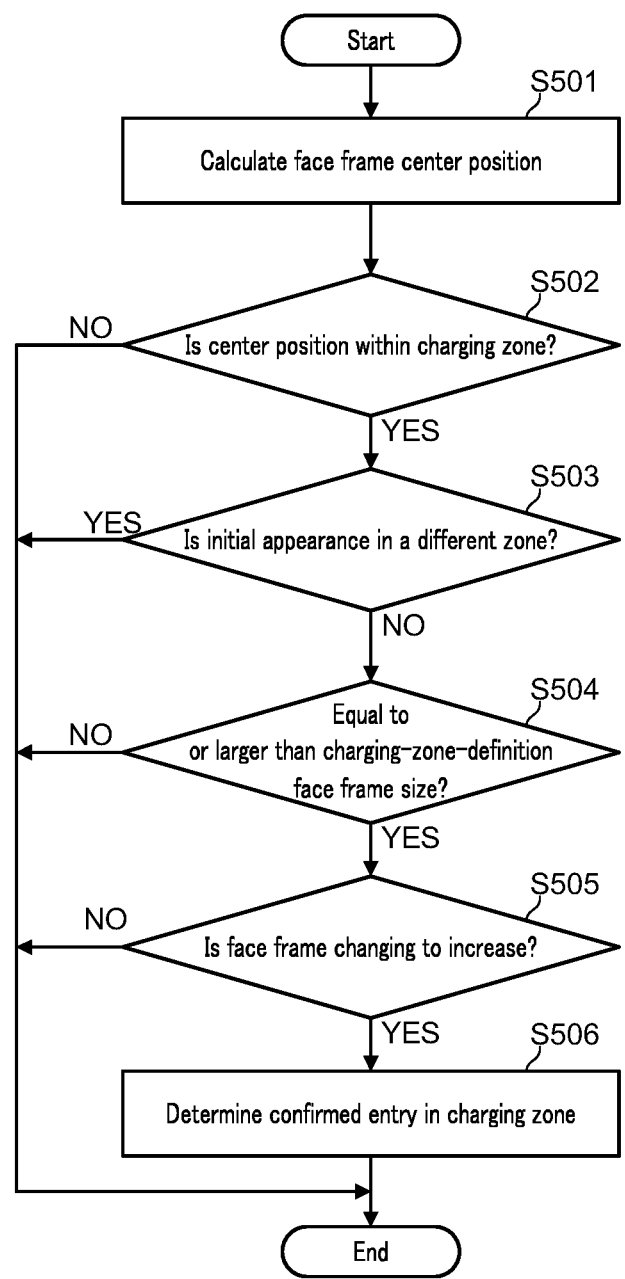
FIG. 15 is a flowchart illustrating an example of determination of passage of a charging line using one camera

FIG. 15 is a flowchart illustrating an example of charging line passage determination using one camera. The process illustrated in FIG. 15 may be executed, for example, in a case where information on an image captured by either one of right camera 11 and left camera 11 is acquired and information on an image is not acquired from the other, or in a case where either one of right camera 11 and left camera 11 is unable to perform image capturing.

Person position estimator 14 calculates the center position of the face frame (S501).

Person position estimator 14 determines whether or not the center position of the face frame exists in a charging zone (for example, PFFA) (S502).

When the center position of the face frame does not exist in the charging zone (for example, PFFA) (NO in S502), person position estimator 14 may terminate the process.

When the center position of the face frame exists in the charging zone (YES in S502), person position estimator 14 determines whether or not the initial appearance of the face frame is in a zone different from the new appearance zone (for example, FFFA) (S503). For example, among pieces of information on face frames indicating the identical person for the face frame whose center position is present in the charging zone, information on a face frame which is detected the earliest is referred to, and it is determined whether or not a detected zone for the referred face frame is the new appearance zone.

When the initial appearance of the center position is in a different zone from the new appearance zone (YES in S503) (for example, when the person of the face frame is not going to pass through gate 10 but is passing in the periphery of gate 10 (for example, passing through another gate neighboring gate 10)), the person is not charged. Thus the flow ends. In this case, a determination result indicating that the person is not charged may be recorded.

When the initial appearance of the center position is not in a different zone from the new appearance zone (for example, FFFA) (NO in S503), person position estimator 14 determines whether or not the size of the face frame is equal to or larger than a face frame size which is a threshold defined for the charging zone (S504).

When the size of the face frame is not equal to or larger than the face frame size defined for the charging zone (NO in S504), person position estimator 14 may terminate the process.

When the size of the face frame is equal to or larger than the face frame size defined for the charging zone (YES in S504), person position estimator 14 determines whether or not the size of the face frame is changing to increase (S505). For example, person position estimator 14 may refer to the information on the face frame indicating the identical person for the face frame being a determination target, and determine whether or not the size of the face frame increases as the image-capturing time at which the image is captured goes on.

When the size of the face frame is not changing to increase (NO in S505) (for example, when the size of the face frame has not been changing (when the person has not moved for a certain period of time)) or when the face frame size decreases (when the person moves away from the charging zone), person position estimator 14 does not charge the person, and thus the process may end. In this case, the determination result indicating that the charging has not been performed may be recorded. In addition, when the same determination result continues for a certain period of time for the person, this means that the person remains in gate 10 for a certain period of time and, thus, a warning may be presented from gate 10.

When the size of the face frame is changing to increase (YES in S505), person position estimator 14 confirms that the person has entered the charging zone (for example, zone C) in gate 10 (S506). Person position estimator 14 indicates the confirmed result to a server (for example, face authentication server 16 and/or passage history management server 17 in FIG. 2A), and the person is thus charged. The process then ends.

By the above-described process, it is possible to determine, using an image captured by one of cameras 11, whether or not a person has entered the charging zone. Therefore, even when one of cameras 11 has a failure or when one of cameras 11 fails to capture an image by an obstruct or the like, it is possible to appropriately charge the person who has passed through gate 10.

It should be noted that, the above-described embodiment has been described in which the zones of FFFA, MFFA, and PFFA do not overlap with each other, but the present disclosure is not limited to this. Two or more zones may overlap each other. In this case, a threshold for the size of the face frame may be provided in each zone, and when the center position of the face frame resides in a zone and the size of the face frame exceeds the threshold of the zone in which the center position resides, it may be determined that the face frame is located in the zone. By performing this determination on the PFFA where the face frame is largest, MFFA, and FFFA in this order, it is possible to appropriately determine which zone the face frame resides even when the center position of the face frame exists in the overlapping regions of the zones. For example, when the center position of the face frame resides in both the PFFA and MFFA (present in a zone where the PFFA and MFFA overlap), and when the size of the face frame exceeds the threshold associated with the PFFA, determination of whether or not the size of the face frame exceeds the threshold associated with the MFFA is omitted and it is determined that the face frame resides in the PFFA. When the size of the face frame is equal to or smaller than the threshold associated with the PFFA, and when the size of the face frame exceeds the threshold associated with the MFFA, it is determined that the face frame resides in the MFFA. Likewise, when the center position of the face frame resides in both the MFFA and FFFA, it is determined first whether or not the face frame resides in the MFFA, and after it is determined that the face frame does not resides in the MFFA, it is determined whether or not the face frame resides in the FFFA. Generally, the face frame is the largest in the PFFA and is the smallest in the FFFA. Thus, in accordance with this magnitude relationship, the thresholds to be associated with the respective zones may be set. However, other values may be adopted, such as a threshold set the same among all the zones which the threshold are associated with.

Further, in the above-described embodiment, when a face frame is not detected in an image captured by one of the two cameras in the two-eye system, the charging line passage determination using one camera (one-eye system) is performed, but the present disclosure is not limited thereto. For example, even when the two-eye system is operating normally, the one-eye system may be used. In this case, it is possible to more strictly determine the charging by performing such a control as to charge a person when the person passes the charging line in the both systems, but not charge the person when the person does not pass the charging line in either system. Also, when the person is charged in the case where the person passes the charging line in either method, it can be ensured that the charging is performed even when the determination is erroneous in either system. Further, only the one-eye system may be used.

The above-described embodiment has been described in relation to the system for managing passage of a person passing through gate 10, but the present disclosure is not limited to this. For example, the present disclosure may be applied to a case where a side wall of a path and a restriction portion (for example, a door) that restricts passage of the person are not provided. For example, the present disclosure may be applied as long as the path is a moving path from one zone to another zone for which an entry of a person is permitted in accordance with an authentication process. In this case, a camera that captures the face of the person passing through the moving path may be installed, for example, in a support portion or the like disposed on the moving path. In addition, although the above-described embodiment has been described in relation to an example of charging a person who has passed through gate 10, the present disclosure is not limited to this. For example, the present disclosure may be applied to the recording and/or management of passage without charging. In addition, for example, in such a case as a ticket gate of a station where an entry is recorded at the time of entering, and charging is performed based on the entry record at the time of exit, the present disclosure may be applied to both the entry and exit.

In the embodiment, the determination is performed using the right image and the left image captured at the same time, but the present disclosure is not limited to this. For example, a right image and a left image captured not at the same time but at a synchronized time may be used. In this case, by determining whether or not the distance of the face frame is equal to or less than a threshold, using the right image and the left image captured at closest timings, it is possible to obtain the same determination result as in the above-described embodiment.

Further, the present embodiment has been described in relation to an example in which an authentication target is a person, but the present disclosure is not limited to this. For example, the present disclosure may be applied to a moving object such as an animal or a vehicle. Further, the present embodiment has been described in relation to an example in which face authentication is performed, but the present disclosure is not limited to this. For example, the present disclosure may be applied to other authentication methods such as authentication using an ID card indicating that a user has the right to pass through a gate, and biometric authentication.

In addition, the face authentication and another authentication method may be used in combination. Even when passage is not permitted by the face authentication of the disclosed embodiment described above, passage may be exceptionally permitted by inputting information of an ID card.

Further, cameras 11 in the above-described embodiment are described as being used for both the authentication process and the tracking process, but the present disclosure is not limited to this. For example, the images captured by cameras 11 may be used for the tracking process (position estimation process) of tracking a person, and may not be used for the face authentication process. For example, when authentication using an ID card indicating that a user has the right to pass through the gate and other authentication such as biometric authentication are used instead of the face authentication process, the images captured by cameras 11 may be used in the tracking process (position estimation process) for tracking the person and may not be used in the face authentication process.

Further, in the above-described embodiment, cameras 11 are not limited to the example in which the cameras are installed on side walls V. For example, cameras 11 may be attached to a support portion disposed at gate 10. The support portion may be, for example, a pole extending in a vertical direction from gate 10, or may be an arcuate member disposed over the side walls of gate 10. Further, gate 10 is not limited to the example in which the path is defined by two side walls V. For example, side walls V do not have to be disposed. In the absence of side walls V, cameras 11 may be placed at a desired position by a member such as a pole. Even in the configuration without side walls V, the person is tracked based on the positional relation between the face frames detected from the images captured by cameras 11 in the same manner as in the above-described embodiment. Further, with respect to the configuration described in the above-described embodiment, person tracking using a camera that further performs image capturing from another angle may be used in combination. For example, person tracking using a ceiling camera may be used in combination. By using the person tracking in combination, it is possible to improve the estimation accuracy of estimating the position and the moving direction of the person. For example, a monitoring camera installed as a ceiling camera in station premises may be used in combination.

Further, in the present embodiment described above, the success or failure of the face authentication process by face authentication functional unit 13 and the success or failure of each determination of passage of the leaving line by passage management functional unit 15 may be output using a sound and/or an image. At this time, different sounds and/or images may be output depending on the success/failure of the face authentication process and the success/failure of the determination of passage over the leaving line. Accordingly, it is possible to make the person who is going to pass through gate 10 aware that determination of both the face authentication and the passage of the charging line are performed. In addition, when a person fails to pass through gate 10, it is possible to notify the person of the failure while distinguishing between the failure at a step of obtaining permission to pass through gate 10 (success or failure of the face authentication process) and the failure at a step of checking the passage through the gate (success or failure of passage).

Further, in the above-described embodiment, the door is used as a means for restricting the passage through gate 10, but the passage may be directly or indirectly restricted by other means. For example, an alarm may be sounded or a warning light may be turned on to indicate to a person attempting to pass through gate 10 that the passage through gate 10 is restricted. In addition, a notification may be sent to a terminal or the like owned by an employee in the vicinity of gate 10 to restrict the employee from passing through the gate.

In addition, depending on a congestion situation, whether or not to perform control to prevent passage or a means for restricting passage may be switched. For example, in an environment in which blockage or restriction of passage by a person is dangerous, such as when a large number of persons enter or leave, the passage through gate 10 may not be blocked, and information indicating that an illegal passage has occurred may be recorded. In this case, the face image or the face authentication result of a person who has performed unauthorized passage may be recorded in association with the information indicating that the unauthorized passage has occurred. It is thus possible to later track the person who has made the unauthorized passage, and to request payment for the right of passage or the like.

In addition, in the above-described embodiment, passage management system 1 manages both entrance to a facility and leaving the facility at an entrance/exit of the facility such as an airport, station, and event hall, but one of the entry to the facility and leaving the facility at the entrance or the exit may be managed, and the other does not have to be managed.

The present disclosure can be realized by software, hardware, or software in cooperation with hardware.

Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI herein may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a Field Programmable Gate Array (FPGA) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a radio transceiver and processing/control circuitry. The radio transceiver may comprise and/or function as a receiver and a transmitter. The radio transceiver, as the transmitter and receiver, may include an RF (radio frequency) module and one or more antennas. The RF module may include an amplifier, an RF modulator/demodulator, or the like. Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)."

In recent years, in Internet of Things (IoT) technology, Cyber Physical Systems (CPSs), which are a new concept of creating new added value by information cooperation between a physical space and cyberspace, has attracted attention. This CPS concept can also be adopted in the above embodiment.

That is, a basic configuration of the CPSs is, for example, such that an edge server disposed in the physical space and a cloud server disposed in the cyberspace can be connected to each other via a network, and processes can be distributedly processed by processors mounted in these servers. Here, it is preferable that pieces of processed data generated in the edge server or the cloud server be generated on a standardized platform. By using such a standardized platform, it is possible to efficiently build a system including various sensor groups and IoT application software.

The communication may include data communication through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

Various embodiments have been described with reference to FIGS. hereinabove. Obviously, the present disclosure is not limited to these examples. Obviously, a person skilled in the art would arrive variations and modification examples within a scope described in claims, and it is understood that these variations and modifications are within the technical scope of the present disclosure. Moreover, any combination of features of the above-mentioned embodiments may be made without departing from the spirit of the present disclosure.

While examples of the present disclosure have been described in detail above, those examples are mere examples and do not limit the scope of the appended claims. The techniques disclosed in the scope of the appended claims include various modifications and variations of the concrete examples exemplified above.

The disclosure of Japanese Patent Application No. 2021-069251, filed on Apr. 15, 2021, including the specification, drawings and abstract, is incorporated herein by reference in its entirety.

INDUSTRIAL APPLICABILITY

An embodiment of the present disclosure is suitable for a face authentication system.

REFERENCE SIGNS LIST

1 Passage management system
10 Gate
11 Camera
13 Face authentication functional unit
131 Camera controller
132 Face collation processor
14 Person position estimator
141 Person tracking processor
15 Passage management functional unit 151 Passage management state transition processor
152 History manager
153 History DB
16 Face authentication server
17 Passage history management server

The invention claimed is:

1. An information processing apparatus, comprising:
a detector implemented by one or more processors and configured to digitally analyze image data to detect a first face image region included in a first image of a person entering a gate and a second face image region included in a second image of the person, the first image being captured in a first direction, the second image being captured in a second direction different from the first direction; and
an estimator implemented by the one or more processors and configured to estimate from pixel-coordinate data of the detected first and second face image regions, a position of the person in the gate based on a change in a relative positional relation between the first face image region and the second face image region over successive image frames.

2. The information processing apparatus according to claim 1, wherein
an image-capturing timing for capturing the first image and an image-capturing timing for capturing the second image are synchronized with each other.

3. The information processing apparatus according to claim 1, wherein
the estimator estimates the position of the person in the gate based on a change in distance between a representative point of the first face image region and a representative point of the second face image region.

4. The information processing apparatus according to claim 3, wherein
when the distance in a horizontal direction between the representative point of the first face image region and the representative point of the second face image region is equal to or less than a threshold, the estimator determines that the person has passed a position defined for the gate.

5. The information processing apparatus according to claim 3, wherein
when a polarity of the distance in a horizontal direction from the representative point of the first face image region to the representative point of the second face image region is reversed, the estimator determines that the person has passed a position defined for the gate.

6. The information processing apparatus according to claim 4, further comprising:
a face collation processor that performs collation on a face of the person before the person passes the position defined, wherein
the information processing apparatus outputs a sound or an image different between a case where the collation on the face of the person is successful and a case where the person is determined to have passed the position defined.

7. The information processing apparatus according to claim 3, wherein:
the detector sets, in the first image, an area in which the representative point of the first face image region is predicted to appear first in response to an entry of the person into the gate, and when it is determined that the area includes a plurality of the representative points of the first face image region, the estimator stops estimation of the position of the person.

8. The information processing apparatus according to claim 3, wherein the representative point of the first face image region and the representative point of the second face image region are centers of the first face image region and the second face image region, respectively.

9. The information processing apparatus according to claim 1, wherein the estimator uses, for estimation of the position of the person in the gate, information expressing a relation between, on one hand, information indicating a positional relation between the first face image region and the second face image region, and, on the other hand, the position of the person in the gate.

10. The information processing apparatus according to claim 1, wherein when the first face image region is not detected, the estimator determines whether or not the person has entered a specific region of the gate, based on whether or not a size of the second face image region is equal to or larger than a threshold.

11. An information processing system, comprising:

an authentication apparatus that executes an authentication process of authenticating a person using at least one of a first image of a person entering a gate and a second image of the person, the first image being captured in a first direction, the second image being captured in a second direction different from the first direction; and an information processing apparatus including one or more processors configured to:

detect, by digitally analyzing image data, a first face image region included in the first image and a second face image region included in the second image; and estimate, using pixel-coordinate information of the detected face image regions, a position of the person in the gate based on a change in a relative positional relation between the first face image region and the second face image region over successive image frames.

12. An estimation method, comprising steps performed by an information processing apparatus of:

digitally analyzing image data to detect a first face image region included in a first image of a person entering a gate and a second face image region included in a second image of the person, the first image being captured in a first direction, the second image being captured in a second direction different from the first direction; and estimating, from pixel-coordinate information of the detected first and second face image regions, a position of the person in the gate based on a change in a relative positional relation between the first face image region and the second face image region over successive image frames.

\* \* \* \* \*